(12) United States Patent
Kim et al.

(10) Patent No.: US 10,120,490 B2
(45) Date of Patent: Nov. 6, 2018

(54) DRIVING CIRCUIT, TOUCH DISPLAY DEVICE, AND METHOD OF DRIVING THE TOUCH DISPLAY DEVICE

(71) Applicant: LG Display Co., Ltd., Seoul (KR)

(72) Inventors: SungChul Kim, Goyang-si (KR); JuHan Kim, Bucheon-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/216,656

(22) Filed: Jul. 21, 2016

(65) Prior Publication Data

US 2017/0220183 A1    Aug. 3, 2017

(30) Foreign Application Priority Data

Jan. 29, 2016   (KR) ........................ 10-2016-0011723

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 2203/04107* (2013.01)

(58) Field of Classification Search
CPC ....... G06F 3/041; G06F 3/0414; G06F 3/0416
See application file for complete search history.

(56) References Cited

U.S. PATENT DOCUMENTS

| 2011/0267293 | A1* | 11/2011 | Noguchi | G06F 3/0416 345/173 |
| 2012/0162122 | A1* | 6/2012 | Geaghan | G06F 3/0414 345/174 |
| 2012/0256876 | A1 | 10/2012 | Yeh et al. | |
| 2014/0247239 | A1* | 9/2014 | Jamshidi-Roudbari | G06F 3/0414 345/174 |
| 2015/0042616 | A1* | 2/2015 | Takagi | G06F 3/0412 345/174 |
| 2015/0084876 | A1 | 3/2015 | Schwartz | |
| 2015/0091843 | A1 | 4/2015 | Ludden | |

(Continued)

FOREIGN PATENT DOCUMENTS

KR    10-2015-0027529 A    3/2015
KR    10-2016-0004242 A    1/2016
(Continued)

OTHER PUBLICATIONS

Korean Office Action, Korean Application No. 10-2016-0011723, dated Feb. 1, 2017, 7 pages (with concise explanation of relevance).
(Continued)

*Primary Examiner* — Michael Faragalla
*Assistant Examiner* — Chayce Bibbee
(74) *Attorney, Agent, or Firm* — Fenwick & West LLP

(57) ABSTRACT

A driving circuit, a touch display device, and a method of driving the touch display device, in which, when a user touches a screen, not only can a touch point be sensed, but also a level of touch force with which the user presses the screen can also be efficiently sensed, in order to provide a range of functions. It is possible to provide a variety of functions that are not supported by related-art touch sensing technologies.

30 Claims, 55 Drawing Sheets

(56) References Cited

U.S. PATENT DOCUMENTS

| | | | |
|---|---|---|---|
| 2015/0331517 A1* | 11/2015 | Filiz | G06F 3/0414 |
| | | | 345/173 |
| 2016/0062504 A1 | 3/2016 | Hwang et al. | |
| 2016/0156870 A1* | 6/2016 | Kikuchi | H04N 5/37457 |
| | | | 348/300 |
| 2017/0068376 A1 | 3/2017 | Kim et al. | |
| 2017/0075493 A1 | 3/2017 | Lee et al. | |

FOREIGN PATENT DOCUMENTS

| | | |
|---|---|---|
| KR | 101583765 B1 | 1/2016 |
| TW | 201709039 A | 3/2017 |
| TW | 201710853 A | 3/2017 |
| TW | 201725497 A | 7/2017 |
| TW | 201816573 A | 5/2018 |
| WO | WO 2014/092758 A1 | 6/2014 |
| WO | WO 2015/047374 A1 | 4/2015 |

OTHER PUBLICATIONS

Taiwan First Office Action, Taiwan Application No. 105133769, dated Sep. 21, 2017, 18 pages.
First Office Action, Taiwanese Patent Application No. 107101675, dated Aug. 8, 2018, 14 pages.

\* cited by examiner

DRIVING CIRCUIT, TOUCH DISPLAY DEVICE, AND METHOD OF DRIVING THE TOUCH DISPLAY DEVICE

CROSS REFERENCE TO RELATED APPLICATION

This application claims priority from and the benefit under 35 U.S.C. § 119(a) of Republic of Korea Patent Application Number 10-2016-0011723 filed on Jan. 29, 2016, which is hereby incorporated by reference for all purposes as if fully set forth herein.

BACKGROUND

Field

The present disclosure relates to a driving circuit, a touch display device, and a method of driving the touch display device.

Description of Related Art

In response to the development of the information society, there has been increasing demand for various types of display devices able to display images. A range of display devices, such as liquid crystal display (LCD) devices, plasma display panels (PDPs), and organic light-emitting diode (OLED) display devices, are in common use.

Such display devices may be included in mobile devices, such as smartphones and tablets, and medium-sized or larger display devices, such as smart TVs, to provide a touch-based user interface for user convenience according to various device characteristics.

Such display devices allowing for touch-based device interactions are being developed to provide a wider range of functions, and user demands are also becoming ever more diverse.

However, currently available touch-type user interfaces are designed to only detect a point touched by a user (touch coordinates) and execute input processing at the sensed touch point. Current touch-type user interfaces are limited in current circumstances in which a large number of functions must be provided in a range of types and shapes and a large number of user demands must be satisfied.

BRIEF SUMMARY

Various aspects of the present disclosure provide a driving circuit, a touch display device, and a method of driving the touch display device, in which, when a user touches a screen, not only can a touch point be sensed, but also a level of touch force with which the user presses the screen can also be efficiently sensed, in order to provide a range of functions.

Also provided are a driving circuit, a touch display device, and a method of driving the touch display device, in which electrodes of a single type disposed within a display panel can be used for three distinct driving operations, including display (image output), touch sensing, and force sensing.

Also provided are a driving circuit, a touch display device, and a method of driving the touch display device, in which, when electrodes of a single type disposed within a display panel are used for three distinct driving operations, including display (image output), touch sensing, and force sensing, the three distinct driving operations can be performed without confusion or interference.

According to an aspect of the present disclosure, a touch display device may include: a plurality of first electrodes disposed within a display panel; a second electrode disposed outside the display panel; and a driving circuit, the driving circuit applying a touch driving signal to at least one first electrode among the plurality of first electrodes in each touch driving period and applying a first force driving signal to at least one first electrode among the plurality of first electrodes and a second force driving signal to the second electrode in a force driving period.

According to another aspect of the present disclosure, provided is a method of driving a touch display device. The method includes: driving a display panel in a display driving period; determining whether or not a screen is touched or detecting a touch point by sequentially driving at least one first electrode among a plurality of first electrodes disposed in the display panel in a touch driving period; and detecting a level of touch force by driving at least one first electrode among the plurality of first electrodes and driving a second electrode in a force driving period, wherein a gap is formed between the second electrode and each of the plurality of first electrodes, with a size of the gap being changeable depending on the level of touch force.

According to further another aspect of the present disclosure, a driving circuit includes: a signal generating circuit generating a touch driving signal and a first force driving signal; a first electrode driving circuit, the first electrode driving circuit receiving the touch driving signal and sequentially applying the touch driving signal to at least one first electrode among a plurality of first electrodes in a touch driving period, and receiving the first force driving signal and applying the first force driving signal to at least one first electrode among the plurality of first electrodes in a force driving period; and a second electrode driving circuit applying a second force driving signal to a second electrode disposed outside a display panel in the force driving period According to yet another aspect of the present disclosure, a driving circuit includes: a touch driving circuit sequentially applying a touch driving signal to at least one first electrode among a plurality of first electrodes disposed within a display panel in a touch driving period; and a force driving circuit applying a first force driving signal to at least one first electrode among the plurality of first electrodes in a force driving period.

According to the present disclosure as set forth above, when a user touches a screen, not only can a touch point be sensed, but also a level of touch force with which the user presses the screen can also be efficiently sensed, in order to provide a range of functions.

According to the present disclosure, electrodes of a single type disposed within a display panel can be used for three distinct driving operations, including display (image output), touch sensing, and force sensing, thereby reducing the number of electrodes required for the three driving operations.

According to the present disclosure, when electrodes of a single type disposed within a display panel are used for three distinct driving operations, including display (image output), touch sensing, and force sensing, the three distinct driving operations can be performed without confusion or interference.

In one embodiment, a touch display device comprises a plurality of first electrodes disposed within a display panel; one or more second electrodes separated from the first electrodes by a gap; and a driving circuit. The driving circuit is configured to provide a touch driving signal to at least one first electrode among the plurality of first electrodes in a touch driving period; sense touch position based on the touch driving signal; provide a first force driving signal to the at least one first electrode among the plurality of first electrodes during a force driving period, and provide a second force driving signal different than the first force driving signal to the one or more second electrodes during the force driving period; and sense force touch based on the first force driving signal and the second force driving signal.

In one embodiment, a method of driving a touch display device is disclosed. The method comprises providing a touch driving signal to at least one first electrode among the plurality of first electrodes during a touch driving period; sensing touch position based on the touch driving signal; providing a first force driving signal to the at least one first electrode among the plurality of first electrodes during a force driving period, and providing a second force driving signal different than the first force driving signal to the one or more second electrodes during the force driving period; and sensing force touch based on the first force driving signal and the second force driving signal.

In one embodiment, a driving circuit for the touch display device is disclosed. The driving circuit comprises a first circuit to provide a touch driving signal to at least one first electrode among the plurality of first electrodes during a touch driving period, to provide a first force driving signal to the at least one first electrode among the plurality of first electrodes during a force driving period, and provide a second force driving signal different than the first force driving signal to the one or more second electrodes during the force driving period. The driving circuit also comprises a second circuit to sense touch position based on the touch driving signal and to sense force touch based on the first force driving signal and the second force driving signal.

BRIEF DESCRIPTION OF THE DRAWINGS

The above and other objects, features and advantages of the present disclosure will be more clearly understood from the following detailed description when taken in conjunction with the accompanying drawings, in which.

DETAILED DESCRIPTION

Figure 1:
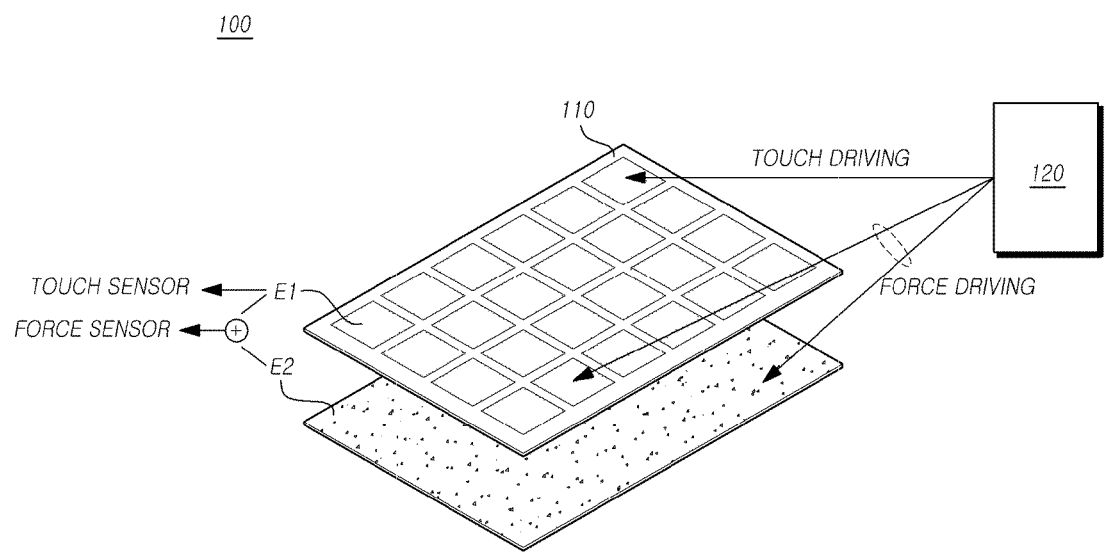
FIG. 1 schematically illustrates a touch display device according to exemplary embodiments.

Reference will now be made in detail to embodiments of the present disclosure, examples of which are illustrated in the accompanying drawings. Throughout this document, reference should be made to the drawings, in which the same reference numerals and signs will be used to designate the same or like components. In the following description of the present disclosure, detailed descriptions of known functions and components incorporated herein will be omitted in the case that the subject matter of the present disclosure may be rendered unclear thereby.

It will also be understood that, while terms such as "first," "second," "A," "B," "(a)," and "(b)" may be used herein to describe various elements, such terms are only used to distinguish one element from another element. The substance, sequence, order or number of these elements is not limited by these terms. It will be understood that when an element is referred to as being "connected to" or "coupled to" another element, not only can it be "directly connected" or "coupled to" the other element, but it can also be "indirectly connected or coupled to" the other element via an "intervening" element. In the same context, it will be understood that when an element is referred to as being formed "on" or "under" another element, not only can it be directly formed on or under another element, but it can also be indirectly formed on or under another element via an intervening element.

FIG. 1 schematically illustrates a touch display device according to exemplary embodiments.

Referring to FIG. 1, the touch display device 100 according to the present embodiments can provide not only a display function to display images, but also a "touch sensing function" to determine whether or not the screen is touched by a pointer, such as a finger or a pen, and/or to detect a touch position (touch coordinates) and a "force sensing function" to detect a level of touch force corresponding to the amount of force (pressure) applied by a user touching the screen.

The term "touch" used herein means an action that the user touches a display panel 110 with the pointer, such as a finger or a pen.

The touch may be divided into "soft touch" in which the amount of force (pressure) of pressing the display panel 110 is equal to or less than a predetermined magnitude and "force touch" in which the amount of force (pressure) of pressing the display panel 110 is greater than the predetermined magnitude.

When a soft touch is performed, the touch display device 100 can determine whether or not the screen is touched and/or detect a touch point (touch coordinates) using the touch sensing function.

When a force touch is performed, the touch display device 100 can detect the amount of force or pressure (touch force) applied by the user using the force sensing function or the like.

For the touch position sensing function, the pointer must be a pointer, such as a finger or a pen, including a conductor or formed from a conductor. In contrast, for the force sensing function, the pointer may be a pointer formed from not only a conductor, but also a nonconductor. The pointer for the force sensing function may be any type of pointers that can press the screen.

Referring to FIG. 1, the touch display device 100 according to the present embodiments includes a plurality of first electrodes E1, at least one second electrode E2, and a driving circuit 120.

The plurality of first electrodes E1 form "touch sensors" required to determine whether or not the screen is touched and to detect touch position coordinates. The plurality of first electrodes E1 may be disposed on a touchscreen panel separate from the display panel 110 or may be disposed within the display panel 110.

When the plurality of first electrodes E1 are disposed within the display panel 110, the display panel 110 may be referred to as a "touchscreen embedded display panel" within which the plurality of first electrodes E1 functioning as the touch sensors are disposed.

The touchscreen disposed within the display panel 110 may be an in-cell touchscreen panel or an on-cell touchscreen panel.

The second electrode E2 is an electrode added to sense a level of touch force, and may be located outside (e.g. on the bottom, top, and sides of) the display panel 110.

In order to sense the touch force, not only the second electrode E2 is operated, but also at least one first electrode E1 among the plurality of first electrodes E1 is operated.

Thus, in the touch display device 100 according to the present embodiments, the plurality of first electrodes E1 disposed within the display panel 110 and the second electrode E2 located outside the display panel 110 may be collectively referred to as "force sensors."

Figure 2:
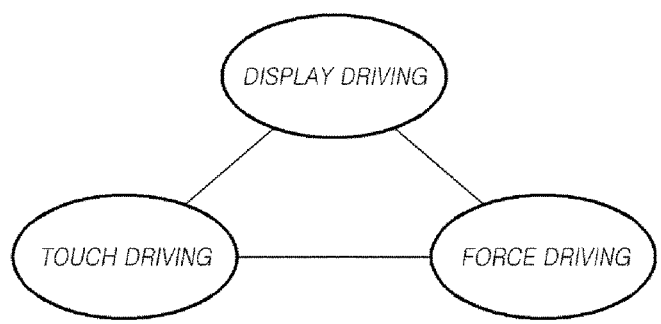
FIG. 2 illustrates three driving operations of the touch display device according to the present embodiments.

FIG. 2 illustrates three driving operations of the touch display device 100 according to the present embodiments.

Referring to FIG. 2, the touch display device 100 according to the present embodiments carries out a display driving operation to perform the display function, a touch driving operation to perform the touch sensing function, and a force driving operation to perform the force sensing function.

In a predefined display driving period, the touch display device 100 according to the present embodiments performs the display driving operation by driving data lines, gate lines, and the like in the display panel 110.

Then, the display function can be provided to the display panel 110, in which the gradation levels of subpixels are controlled via the data lines and the gate lines to display an intended image.

Figure 3:
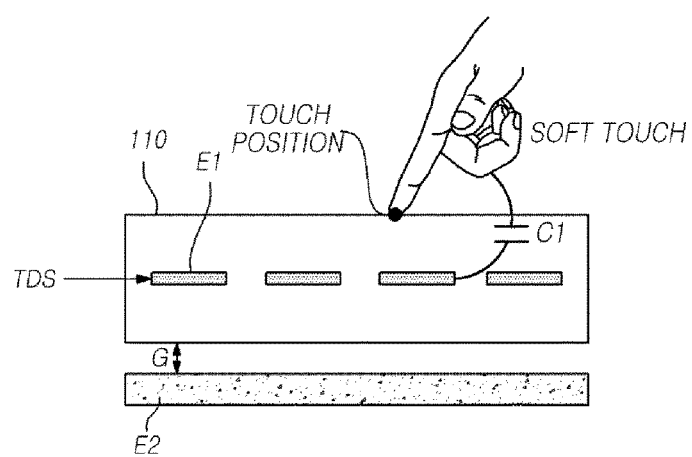
FIG. 3 schematically explains the touch sensing method of the touch display device according to the present embodiments.

FIG. 3 schematically explains the touch sensing method of the touch display device 100 according to the present embodiments.

Referring to FIG. 3, in a predefined touch driving period, the touch display device 100 performs the touch driving operation to sequentially drive the plurality of first electrodes E1 by sequentially applying touch driving signals TDS to the plurality of first electrodes E1.

Then, the touch display device 100 can determine whether or not the screen is touched and/or detect a touch position by detecting a change in the capacitance of each of the first electrodes E1 depending on whether or not a capacitance C1 is formed between each of the first electrodes E1 and the pointer, such as a finger, based on signals received from the first electrodes E1 as a result of the touch driving signals TDS.

In the pointer enabling the touch sensing function, a panel contact portion thereof must be formed from a conductor. For example, the pointer may be a finger or a pen, the panel contact portion of which is formed from a conductor.

Figure 4A:
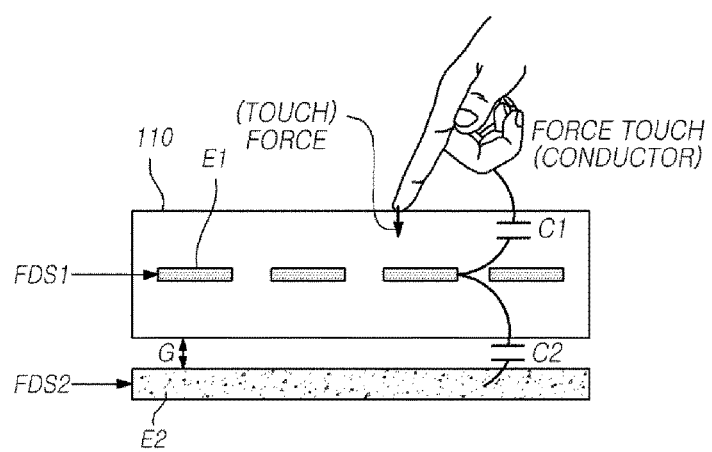
FIG. 4A, FIG. 4B, FIG. 5A, and FIG. 5B schematically explain the force sensing method of the touch display device according to the present embodiments.
Figure 4B:
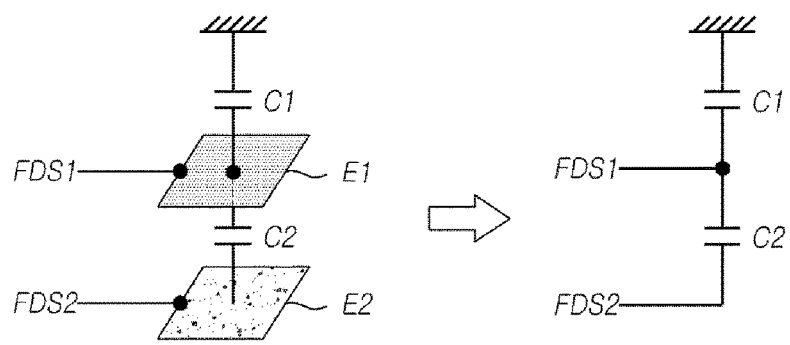
Figure 5A:
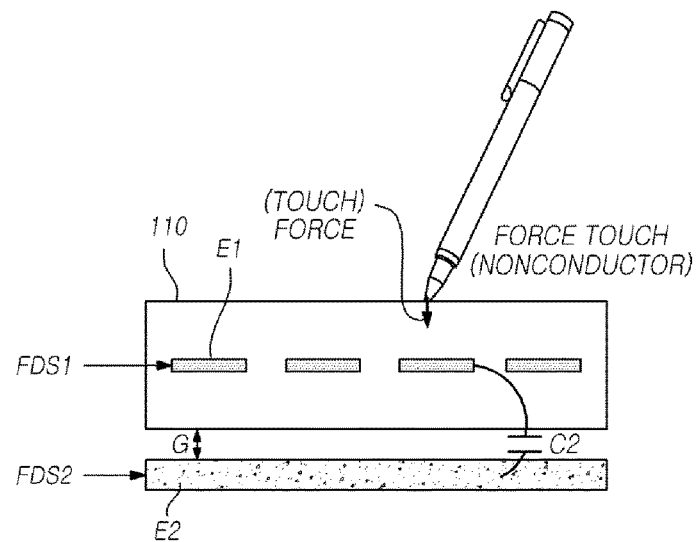
Figure 5B:
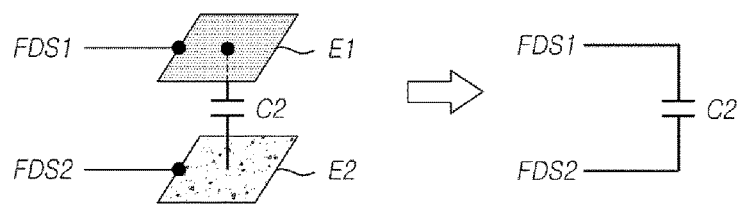

FIG. 4A and FIG. 4B schematically explain the force sensing method of the touch display device according to the present embodiments when a force touch is performed using a pointer, the panel contact portion of which is formed from a conductor. FIG. 5A and FIG. 5B schematically explain the force sensing method of the touch display device according to the present embodiments when a force touch is performed using a pointer, the panel contact portion of which is formed from a nonconductor.

Referring to FIG. 4A to FIG. 5B, the touch display device 100 performs the force driving operation by applying a first force driving signal FDS1 to at least one first electrode E1 among the plurality of first electrodes E1 while applying a second force driving signal FDS2 to the second electrode E2.

In the pointer enabling the force sensing function, a panel contact portion thereof may be formed from a conductor or a nonconductor.

The pointer having the conductive panel contact portion may be, for example, a finger or a pen, the contact portion of which is formed from a conductor. The pointer having the non-conductive panel contact portion may be, for example, a gloved finger or a pen, the contact portion of which is formed from a nonconductor.

Referring to FIG. 4A to FIG. 5B, in order to enable the force sensing function of determining the presence of touch force and the amount of touch force, at least one gap G, the size of which is changeable depending on the amount of touch force, must be present between the plurality of first electrodes E1 and the second electrode E2.

The gap G is only required to be present between plurality of first electrodes E1 and the second electrode E2. The position of the gap G may be variously determined depending on the surrounding structures.

The gap G may be, for example, an air gap or a dielectric gap.

Referring to FIG. 4A and FIG. 4B, in response to the force driving operation, the first force driving signal FDS1 is applied to at least one first electrode E1 among the plurality of first electrodes E1 and the second force driving signal FDS2 is applied to the second electrode E2. Then, a first capacitance C1 is formed between the first electrode E1, to which the first force driving signal FDS1 is applied, and the pointer, the panel contact portion of which is formed from a conductor. A second capacitance C2 is formed between the first electrode E1, to which the first force driving signal FDS1 is applied, and the second electrode E2, to which the second force driving signal FDS2 is applied.

The size of the gap G between the first electrode E1 and the second electrode E2 changes depending on the touch force, thereby changing the second capacitance C2 between first electrode E1 and the second electrode E2.

The touch display device 100 can perform the force sensing function of determining the presence of touch force and/or the amount of touch force by determining a change in the size of the second capacitance C2 between the first electrode E1 and the second electrode E2, based on signals received from the plurality of first electrodes E1 as a result of the force driving signals FDS1 and FDS2.

Referring to FIG. 5A and FIG. 5B, in response to the force driving operation, a first force driving signal FDS1 is applied to at least one first electrode E1 of the plurality of first electrodes E1 and a second force driving signal FDS2 is applied to the second electrode E2. Then, no capacitance is formed between the first electrode E1, to which the first force driving signal FDS1, and the pointer, the panel contact portion of which is formed from a nonconductor, whereas a second capacitance C2 is formed between the first electrode E1, to which the first force driving signal FDS1, and the second electrode E2, to which the second force driving signal FDS2 is applied.

The size of the gap G between the first electrode E1 and the second electrode E2 changes depending on the touch force, thereby changing the second capacitance C2 between first electrode E1 and the second electrode E2.

The touch display device 100 can perform the force sensing function of determining the presence of touch force and/or the amount of touch force by determining a change in the size of the second capacitance C2 between the first electrode E1 and the second electrode E2, based on signals received from the plurality of first electrodes E1.

As described above, the gap G, structurally formed between the first electrode E1 and the second electrode E2, causes the second capacitance C2 between the first electrode E1 and the second electrode E2 to change depending on the level of touch force, whereby force sensing can be performed based on changes in the capacitance.

Figure 6:
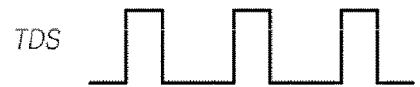
FIG. 6 illustrates a touch driving signal in use for touch sensing according to the present embodiments.

FIG. 6 illustrates a touch driving signal TDS for the touch sensing function according to the present embodiments.

Referring to FIG. 6, in a touch driving period, the touch driving signal TDS applied to a first electrode E1 may be a DC voltage signal or a pulse signal.

Thus, various types of touch driving signals TDS may be used, in consideration of the efficiency of touch driving and the accuracy of touch sensing.

FIG. 7A to FIG. 7H illustrate a first force driving signal FDS1 and a second force driving signal FDS2 for the force sensing function according to the present embodiments.

The force sensing function only requires a potential difference to be formed between the first electrode E1 and the second electrode E2.

In this regard, as illustrated in FIG. 7A to FIG. 7H, in a force driving period, the first force driving signal FDS1 and the second force driving signal FDS2 applied to the first electrode E1 and the second electrode E2 may have a variety of combinations.

Figure 7A:
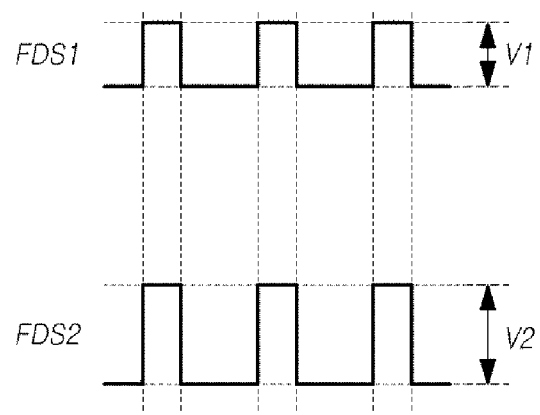
FIG. 7A to FIG. 7H illustrate a first force driving signal and a second force driving signal in use for force sensing according to the present embodiments.
Figure 7B:
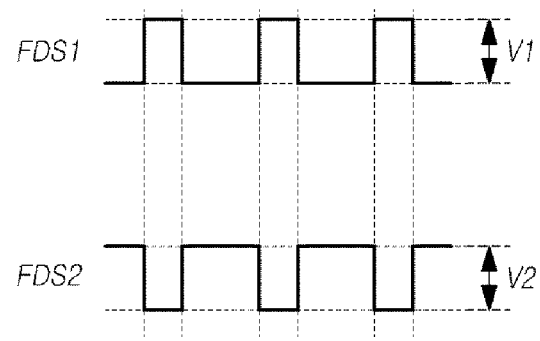

As illustrated in FIG. 7A and FIG. 7B, the first force driving signal FDS1 and the second force driving signal FDS2 may be pulse signals.

Here, the first force driving signal FDS1 may be a pulse signal, the amplitude of which corresponds to a voltage V1, and the second force driving signal FDS2 may be a pulse signal, the amplitude of which corresponds to a voltage V2. V1 and V2 may be the same voltage or different voltages. When the first force driving signal FDS1 and the second force driving signal FDS2 are pulse signals in reverse phase relationship, V1 and V2 may be the same voltage.

Figure 7C:
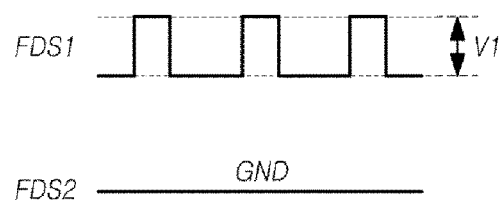
Figure 7D:
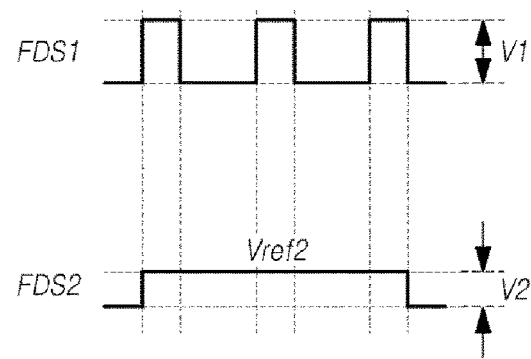

As illustrated in FIG. 7C and FIG. 7D, the first force driving signal FDS1 may be a pulse signal, and the second force driving signal FDS2 may be a signal having a second DC voltage.

Here, the first force driving signal FDS1 may be a pulse signal, the width of which corresponds to the voltage V1. The second force driving signal FDS2 may be a signal having the second DC voltage corresponding to a ground voltage or a signal having the second DC voltage corresponding to a second reference voltage Vref2 of the voltage V2.

Figure 7E:
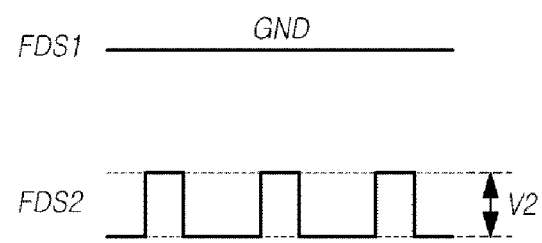
Figure 7F:
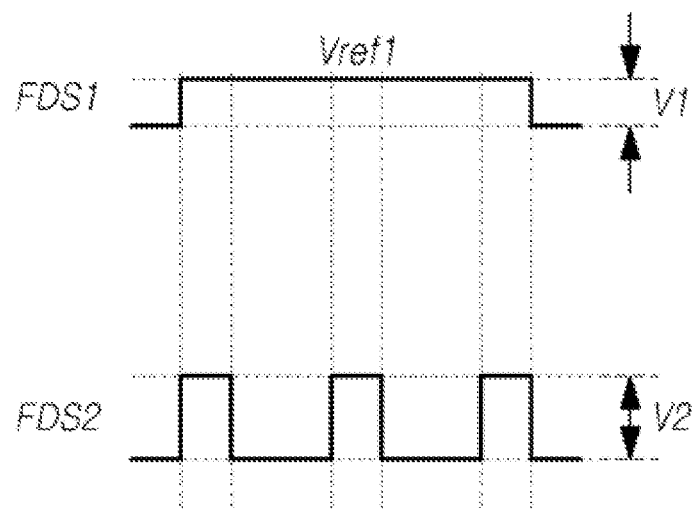

As illustrated in FIG. 7E and FIG. 7F, the first force driving signal FDS1 may be a signal having a first DC voltage, and second force driving signal FDS2 may be a pulse signal.

Here, the first force driving signal FDS1 may be a signal having the first DC voltage corresponding to the ground voltage or a signal having the first DC voltage corresponding to a first reference voltage Vref1 of the voltage V1. The second force driving signal FDS2 may be a pulse signal, the amplitude of which corresponds to the voltage V2.

Figure 7G:
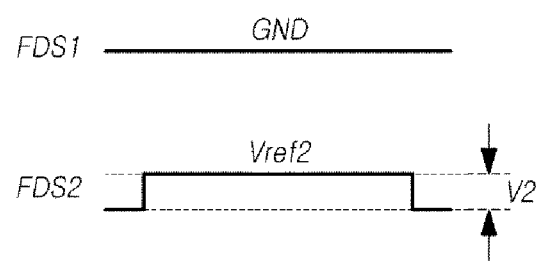
Figure 7H:
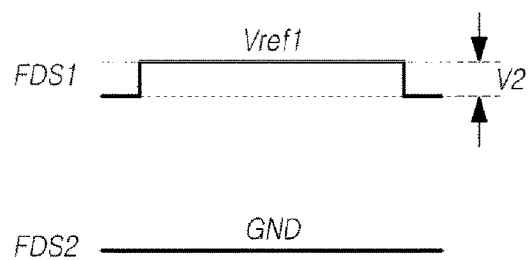

As illustrated in FIG. 7G and FIG. 7H, the first force driving signal FDS1 may be a signal having the first DC voltage, and the second force driving signal FDS2 may be a signal having the second DC voltage.

Here, the first force driving signal FDS1 may be a signal having the first DC voltage corresponding to the ground voltage or a signal having the first DC voltage corresponding to the first reference voltage Vref1 of the voltage V1. The second force driving signal FDS2 may be a signal having the second DC voltage corresponding to the ground voltage or a signal having the second DC voltage corresponding to the second reference voltage Vref2 of the voltage V1.

The first DC voltage may be the ground voltage GND or the first reference voltage Vref1, which is not the ground voltage GND. The second DC voltage may be the ground voltage GND or the second reference voltage Vref2, which is not the ground voltage GND. The first reference voltage Vref1 and the second reference voltage Vref2 may be the same voltage or different voltages.

As described above, it is possible to provide efficient force driving using one of a variety of combinations of the first force driving signal FDS1 and the second force driving signal FDS2.

Among the variety of combinations as mentioned above, in the force driving period F, the first force driving signal FDS1 and the second force driving signal FDS2 may be pulse signals. In this case, as illustrated in FIG. 7A, the first force driving signal FDS1 and the second force driving signal FDS2 may have an in-phase relationship, in which the phases of the signals are the same. Alternatively, as illustrated in FIG. 7B, the first force driving signal FDS1 and the second force driving signal FDS2 may be in reverse phase relationship, in which the phases of the signals have a phase difference of 180°.

As described above, the phase relationship (in-phase relationship or reverse phase relationship) between the first force driving signal FDS1 and the second force driving signal FDS2, which are pulse signals, can be properly selected considering the signal generating component, the force driving component, and the sensing component, thereby improving the efficiency of the signal generating component, force driving, and sensing.

As illustrated in FIG. 7A, in the force driving period F, when the first force driving signal FDS1 and the second force driving signal FDS2 are pulse signals having an in-phase relationship, the second force driving signal FDS2 may be a signal, the phase of which is the same as that of the first force driving signal FDS1, and the amplitude of which is greater than that of the first force driving signal FDS1.

As described above, when the first force driving signal FDS1 and the second force driving signal FDS2, each having the form of a pulse signal, are in the in-phase relationship, the amplitude V2 of the second force driving signal FDS2 may be set greater than the amplitude V1 of the first force driving signal FDS1. Consequently, when the force sensing function is performed based on a signal received from the first electrode E1, it is possible to accurately determine the presence of touch force and/or the amount of touch force by accurately determining whether a corresponding touch is a force touch or a soft touch.

As illustrated in FIG. 7G and FIG. 7H, in the force driving period F, when the first force driving signal FDS1 is a signal having the first DC voltage and the second force driving signal FDS2 is a signal having the second DC voltage, the first DC voltage and the second DC voltage may be different voltages.

For example, as illustrated in FIG. 7G, the first DC voltage may be the ground voltage GND, and the second DC voltage may be the second reference voltage Vref2. Alternatively, as illustrated in FIG. 7H, the first DC voltage may be the first reference voltage Vref1, and the second DC voltage may be the ground voltage GND.

In addition, the first DC voltage may be the first reference voltage Vref1, and the second DC voltage may be the second reference voltage Vref2 different from the first reference voltage Vref1.

As described above, when the first force driving signal FDS1 is a signal having the first DC voltage and the second force driving signal FDS2 has a signal having the second DC voltage, the first DC voltage and the second DC voltage may be set different. This consequently enables the force sensing function even in the case in which the force driving operation is simply performed using the first force driving signal FDS1 and the second force driving signal FDS2, each having the form of a pulse signal.

Figure 8A:
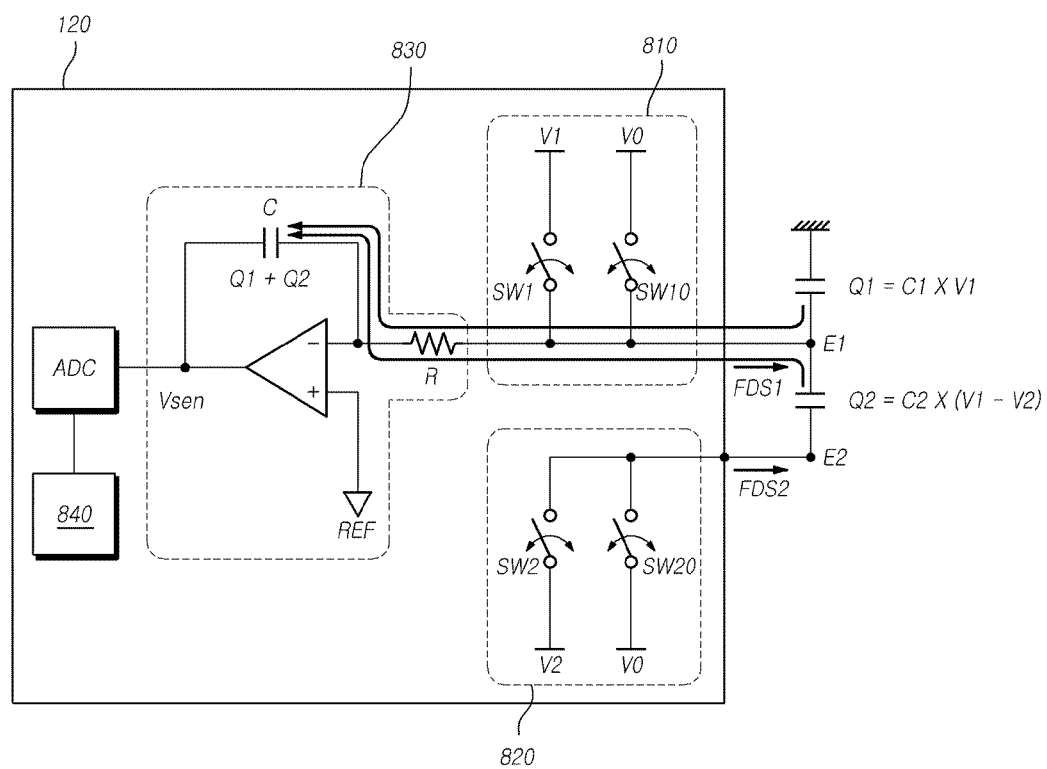
FIG. 8A is an exemplary view of the driving circuit of the touch display device in force driving period according to the present embodiments.

FIG. 8A is an exemplary view of the driving circuit 120 of the touch display device 100 in force driving period according to the present embodiments.

As illustrated in FIG. 8A, the driving circuit 120 includes a first force driving signal provider 810, a second force driving signal provider 820, an integrator 830, an analog-digital converter ADC, and a processor 840. The first force driving signal provider 810 supplies a first force driving signal FDS1 having one of the signal waveforms illustrated in FIG. 7A to FIG. 7H to the first electrode E1 by on/off control of two switches SW1 and SW10. The second force driving signal provider 820 supplies the second force driving signal FDS2 having one of the signal waveforms illustrated in FIG. 7A to FIG. 7H to the second electrode E2 by on/off control of the switches SW1 and SW10. The integrator 830 includes an operation amplifier OP-AMP, a capacitor C, and a resistor R, and produces an output value by integrating an input. The analog-digital converter ADC converts the value output by the integrator to a digital value. The processor 840 calculates touch position coordinates and senses touch force based on the digital value output by the analog-digital converter ADC.

At least one of the analog-digital converter ADC and the processor 840 may be disposed outside the driving circuit 120.

The circuit configuration of the driving circuit 120 illustrated in FIG. 8A is illustrative only and may be embodied in a variety of forms.

Referring to FIG. 8A, in the force driving operation, the driving circuit 120 applies the first force driving signal FDS1 to at least one first electrode E1 among the plurality of first electrodes E1 and applies the second force driving signal FDS2 to the second electrode E2. The driving circuit 120 determines a change in the second capacitance C2 between the corresponding first electrode E1 or a group of the first electrodes E1 and the second electrode E2 by sensing a charge level (or a voltage) depending on a change in the size of the gap G between the corresponding first electrode E1 or the group of the first electrodes E1 and the second electrode E2, based on a signal (an input of the integrator 830) received from each of the first electrodes E1 or the group of the first electrodes E1, thereby determining the presence and/or the amount of touch force of a touch.

Referring to FIG. 8A, a signal (an input of the integrator 830) received from each of the first electrodes E1 or the group of the first electrodes E1 corresponds to a total of charges Q1+Q2 of a charge Q1 charged in a capacitor C1 between the pointer and the first electrode E1 and a charge Q2 charged in a capacitor C2 between the first electrode E1 and the second electrode E2.

The total of charges Q1+Q2 is charged in a capacitor C within the integrator 830 and is output as a sensing voltage Vsen from the integrator 830.

Then, the analog-digital converter ADC converts the sensing voltage Vsen to a digital value.

The processor 840 can determine the presence and/or amount of touch force based on the digital value output to the analog-digital converter ADC.

When the generation of touch force is determined, an application or a function, previously set in correspondence to the touch force, can be performed.

Alternatively, when the amount of touch force is determined, an application or a function, previously set in correspondence to the amount of touch force, can be performed.

Figure 8B:
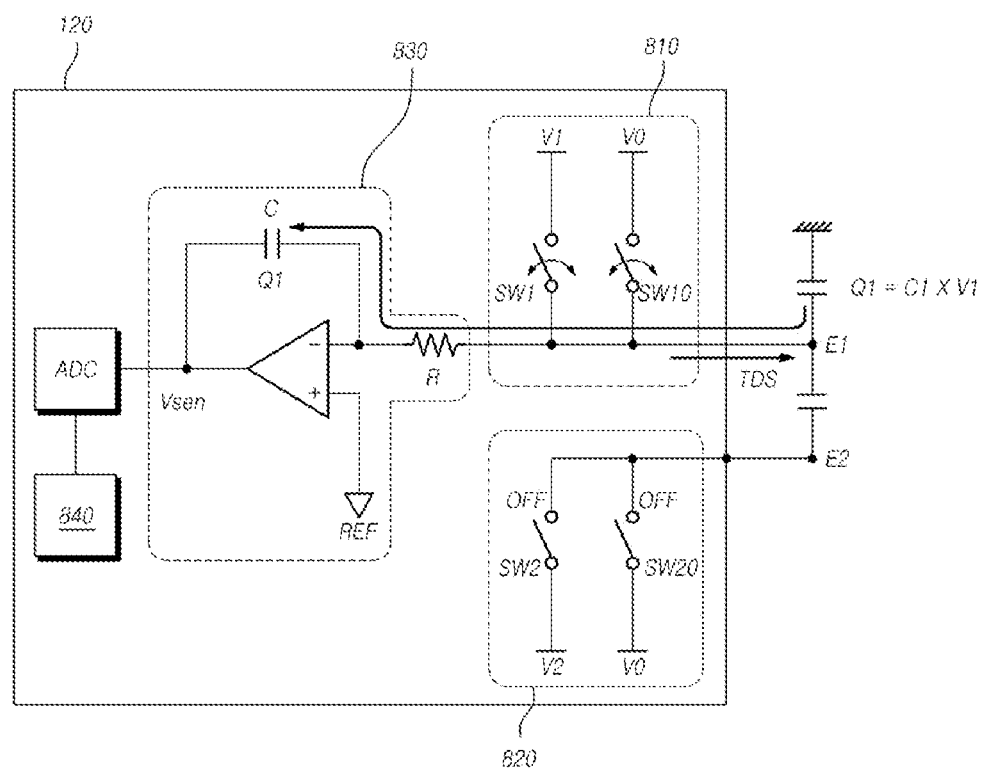
FIG. 8B is an exemplary view of the driving circuit of the touch display device in touch driving period according to the present embodiments.

FIG. 8B is an exemplary view of the driving circuit of the touch display device in a touch driving period according to the present embodiments.

Referring to FIG. 8B, in the touch driving operation, the driving circuit 120 applies the touch driving signal TDS to at least one first electrode E1 among the plurality of first electrodes E1. The driving circuit 120 determines a change in the second capacitance C1 between the corresponding first electrode E1 or a group of the first electrodes E1 and pointer (etc. finger), based on a signal (an input of the integrator 830) received from each of the first electrodes E1 or the group of the first electrodes E1, thereby determining the position of a touch.

The touch driving signal TDS is generated by alternate on/off control of two switches SW1 and SW10 (SW1=OFF, SW10=ON→SW1=ON, SW10=OFF→SW1=OFF, SW10=ON→ . . . ). The touch driving signal TDS is a pulse signal with a desired amplitude (ex. if V0=0 volts, amplitude=V1 volts).

In one embodiment, the touch driving signal TDS may be same or similar as the first force driving signal FDS1 for the first electrodes E1.

In the touch driving operation, two switches SW2 and SW20 are in the off-state. So, no voltage is applied to the second electrode E2. That is, the second electrode E2 is in a floating state. The second capacitance C2 is not formed between the corresponding first electrode E1 or a group of the first electrodes E1 and the second electrode E2.

Referring to FIG. 8B, a signal (an input of the integrator 830) received from each of the first electrodes E1 or the group of the first electrodes E1 corresponds to a charge Q1 charged in a capacitor C1 between the pointer and the first electrode E1.

The charges Q1 are charged in a capacitor C within the integrator 830 and is output as a sensing voltage Vsen from the integrator 830.

Then, the analog-digital converter ADC converts the sensing voltage Vsen to a digital value.

The processor 840 can determine the position of a touch based on the digital value output to the analog-digital converter ADC.

Hereinafter, reference will be made to the characteristics of incoming signals discriminatively generated in response to a soft touch and a force touch as the touch display device 100 according to the present embodiments performs the force driving operation such that the soft touch and the force touch can be distinguished.

Figure 9:
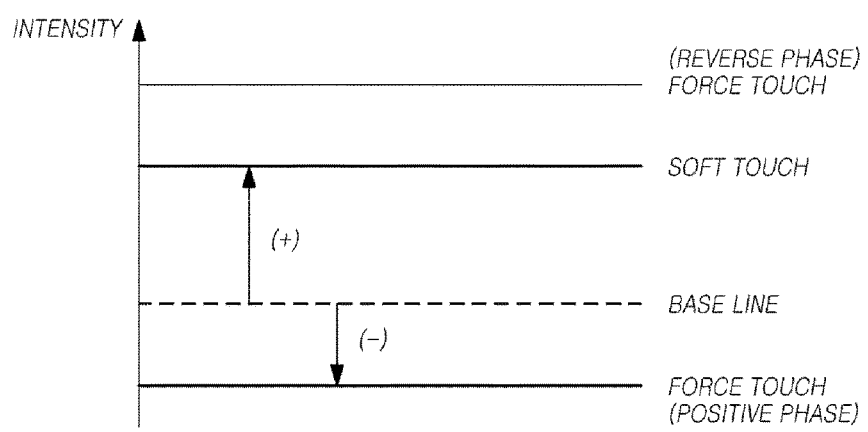
FIG. 9 illustrates the intensity of an incoming signal in response to a soft touch and the intensity of an incoming signal in response to a force touch in the touch display device according to the present embodiments.
Figure 10A:
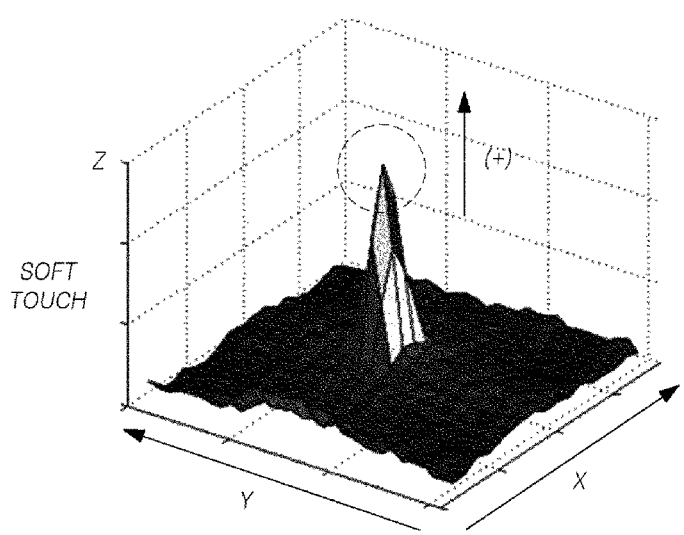
FIG. 10A and FIG. 10B illustrate the intensity distribution of the incoming signals in response to a soft touch and a force touch in the touch display device according to the present embodiments.
Figure 10B:
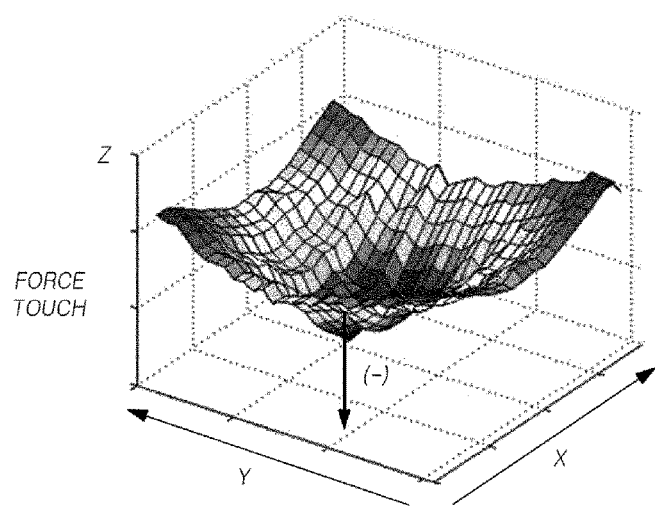

FIG. 9 illustrates the intensity of an incoming signal in response to a soft touch and the intensity of an incoming signal in response to a force touch in the touch display device 100 according to the present embodiments. FIG. 10A and FIG. 10B illustrate the intensity distribution of the incoming signals in response to a soft touch and a force touch in the touch display device 100 according to the present embodiments.

Here, FIG. 9, FIG. 10A, and FIG. 10B are based on the assumption that the first force driving signal FDS1 and the second force driving signal FDS2 are pulse signals as illustrated in FIG. 7A and FIG. 7B.

Referring to FIG. 9, the intensity of a signal received from the first electrode E1 may be determined based on digital values output from the analog-digital converter ADC.

Referring to FIG. 9, in the case of a soft touch, in which the amount of pressing force is equal to or less than a predetermined magnitude, digital values output from the analog-digital converter ADC have positive (+) values with respect to a digital value output from the analog-digital converter ADC when there is no touch (baseline).

Referring to FIG. 9, when the second force driving signal FDS2 is in-phase with the first force driving signal FDS1, digital values output from the analog-digital converter ADC in the case of a force touch, in which the amount of pressing force exceeds the predetermined magnitude, have negative (−) values with respect to a digital value output from the analog-digital converter ADC when there is no touch (baseline).

Referring to FIG. 9, when the second force driving signal FDS2 is in the reverse phase relationship with the first force driving signal FDS1, digital values output from the analog-digital converter ADC in the case of a force touch, in which the amount of pressing force exceeds the predetermined magnitude, have positive (+) values with respect to a digital value output from the analog-digital converter ADC when there is no touch (baseline) and is greater than a digital value output from the analog-digital converter ADC in the case of a soft touch, in which the amount of pressing force is equal to or less than a predetermined magnitude.

As illustrated in FIG. 10A, in the case of a soft touch, the magnitudes of digital values (signal intensity) output from the analog-digital converter ADC are distributed such that the signal intensity generally increases in the positive (+) direction of the z axis based on the baseline.

In addition, as illustrated in FIG. 10A, referring to the distribution of signal intensity in the case of a soft touch, higher values of signal intensity may be concentrated in a location of the entire screen area where the soft touch has occurred.

As illustrated in FIG. 10B, when the second electrode E2 is assumed to be an integral plate when viewed from the outside of the display panel 110, in the case of a force touch, the magnitudes of digital values (signal intensity) output from the analog-digital converter ADC are distributed such that the signal intensity generally increases in the negative (−) direction of the z axis based on the baseline.

In addition, as illustrated in FIG. 10B, in the case of a force touch, signal intensities are distributed such that the signal intensity at the center point of the screen is greatest in the negative (−) direction and the signal intensity gradually increases from the periphery toward the center of the screen.

As the force touch becomes stronger, the change in the size of the gap G between the plurality of first electrodes E1 and the second electrode E2 increases. Consequently, digital value outputs from the analog-digital converter ADC have a greater value in the negative (−) direction of the z axis based on a digital value output from the analog-digital converter ADC when there is no touch (baseline). That is, the stronger the force touch is, the greater the signal intensity becomes.

Figure 11A:
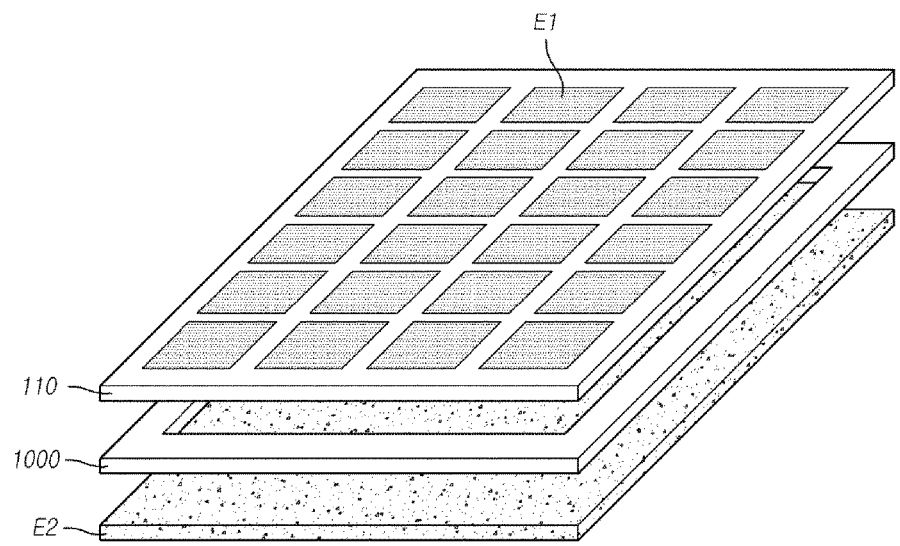
FIG. 11A and FIG. 11B schematically illustrate a force sensing structure of the touch display device according to the present embodiments.
Figure 11B:
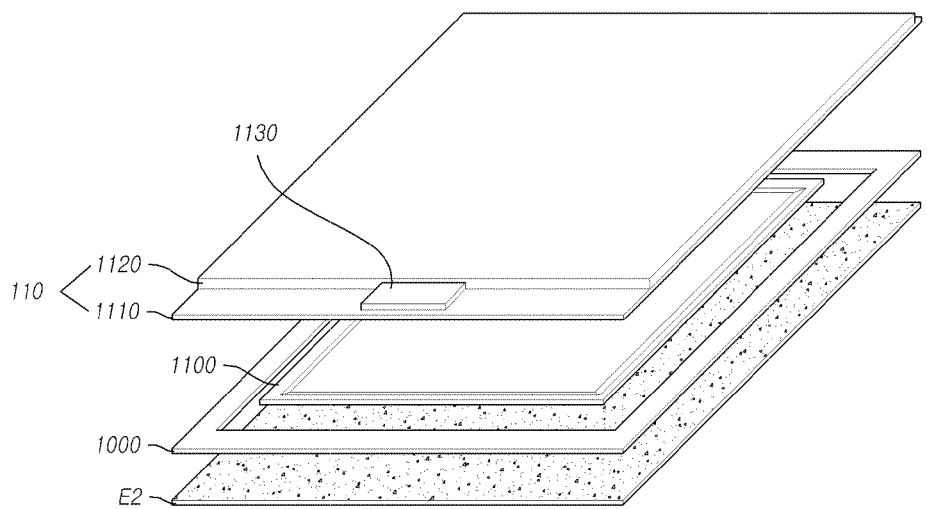

FIG. 11A and FIG. 11B schematically illustrate a force sensing structure of the touch display device 100 according to the present embodiments.

Referring to FIG. 11A, the touch display device 100 according to the present embodiments includes a plurality of first electrodes E1 disposed within a display panel 110 and a second electrode E2 disposed outside (e.g. below) the display panel 110. Each first electrode E1 is a common electrode for a corresponding plurality of pixels (not shown).

In addition, a gap G, the size of which is changeable in response to a force touch, is formed between the plurality of first electrodes E1 and the second electrode E2, such that force sensing is possible.

In this regard, the touch display device 100 according to the present embodiments includes a gap structure unit 1000 forming the gap G between the plurality of first electrodes E1 and the second electrode E2. The gap structure unit 1000 allows the size of the gap G to change in response to the force touch.

The gap structure unit 1000 enables the force sensing function.

The shape (e.g. a frame shape) of the gap structure unit 1000 corresponds to the outline shape of the display panel 110.

The gap structure unit 1000 may be a separate structure or may be embodied by using an existing structure such as a guide panel.

The touch display device 100 according to the present embodiments may be a range of display devices, such as a liquid crystal display (LCD) device or an OLED display device.

Hereinafter, for the sake of brevity, the touch display device 100 according to the present embodiments will be assumed to be an LCD device.

Referring to FIG. 11B, in the touch display device 100 according to the present embodiments, the display panel 110 includes a first substrate 1110 on which thin-film transistors (TFTs) and the like are disposed and a second substrate 1120 on which color filters (CFs) and the like are disposed.

A driving chip 1130 may be disposed on, bonded to, or connected to the peripheral portion (non-active area) of the first substrate 1110.

The driving chip 1130 may be a chip in which a data driving circuit is formed, a chip including a first electrode driving circuit 1310 within the driving circuit 120, or a chip including a data driving circuit and the first electrode driving circuit 1310. In some cases, the driving chip 1130 may be a chip including the driving circuit 120.

Referring to FIG. 11B, a lower structure 1100 is disposed below the display panel 110.

The gap structure unit 1000 may be disposed below, within, or on one side of the lower structure 1100.

The second electrode E2 is disposed below the gap structure unit 1000.

The second electrode E2 may be positioned below or within the lower structure 1100 of the display panel 110.

As described above, the position of the second electrode E2 or the position of the gap structure unit 1000 is variously designed. Thus, the force sensor structure can be designed to be suitable to the designed structures of the display panel 110 and the display device.

Figure 12A:
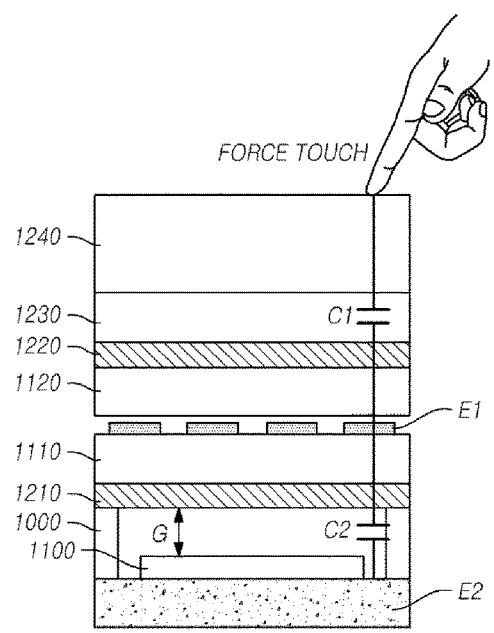
FIG. 12A is a cross-sectional view of the touch display device having the force sensing structure according to the present embodiments.
Figure 12B:
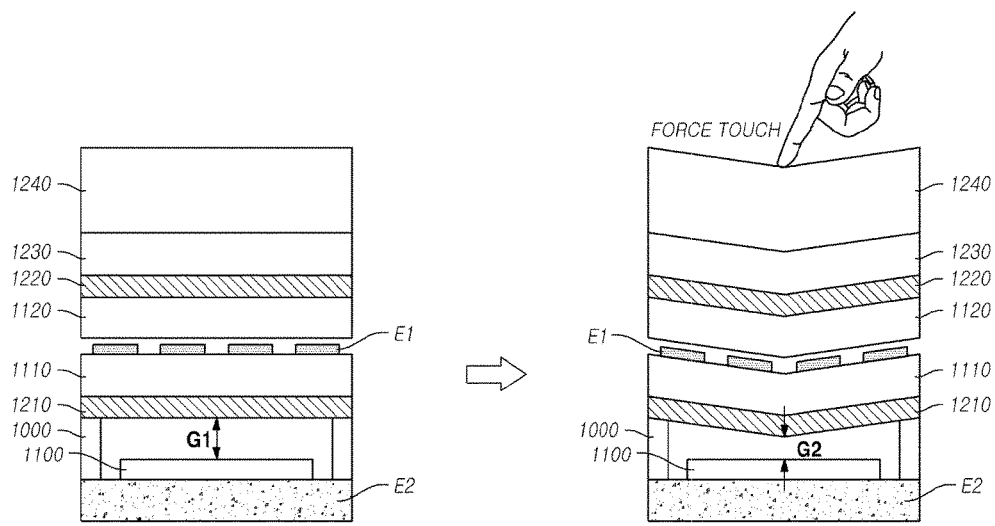
FIG. 12B illustrates a situation in which the size of the gap G changes in response to a force touch.

FIG. 12A is a cross-sectional view of the touch display device 100 having the force sensing structure according to the present embodiments, and FIG. 12B illustrates a situation in which the size of the gap G changes in response to a force touch.

Referring to FIG. 12A, the display panel 110 includes a first polarization plate 1210, a first substrate 1110, a plurality of first electrodes E1, a second substrate 1120, and a second polarization plate 1220.

A bonding layer 1230 and an upper cover 1240 are disposed on the upper part of the display panel 110.

A lower structure 1100 is disposed on the lower part of the display panel 110.

The lower structure 1100 may be a structure that is a part of the display device or a separate structure provided for a second electrode E2.

For example, the lower structure 1100 may be a backlight unit or a rear cover of the LCD device.

In addition, the lower structure 1100 may be any structure that can form a capacitor between each of the first electrodes E1 and the second electrode E2.

Referring to FIG. 12A, for example, the gap structure unit 1000 has the shape of a frame, and is situated between the periphery of the rear surface of the display panel 110 and the periphery of the second electrode E2.

In addition, the lower structure 1100, such as a backlight unit, is situated in a space between the rear surface of the display panel 110 (the rear surface of the first polarization plate 1210) and the second electrode E2, defined by the gap structure unit 1000.

A gap G, such as an air gap or a dielectric gap, is present between the rear surface of the display panel 110 (the rear surface of the first polarization plate 1210) and the lower structure 1000.

Referring to FIG. 12b, in the case of a force touch, the upper cover 1240, the display panel 110, and the like are slightly warped downward.

This consequently changes the size of the gap g, such as an air gap or a dielectric gap, disposed between the first electrodes E1 and the second electrode E2.

When the gap G prior to the force touch is designated with G1 and the gap G after the force touch is designated with G2, G2 is reduced to be smaller than G1 in response to the touch force.

With the gap G being reduced from G1 to G2 after the force touch, a second capacitance C2 is changed, whereby the force touch can be recognized.

Figure 13A:
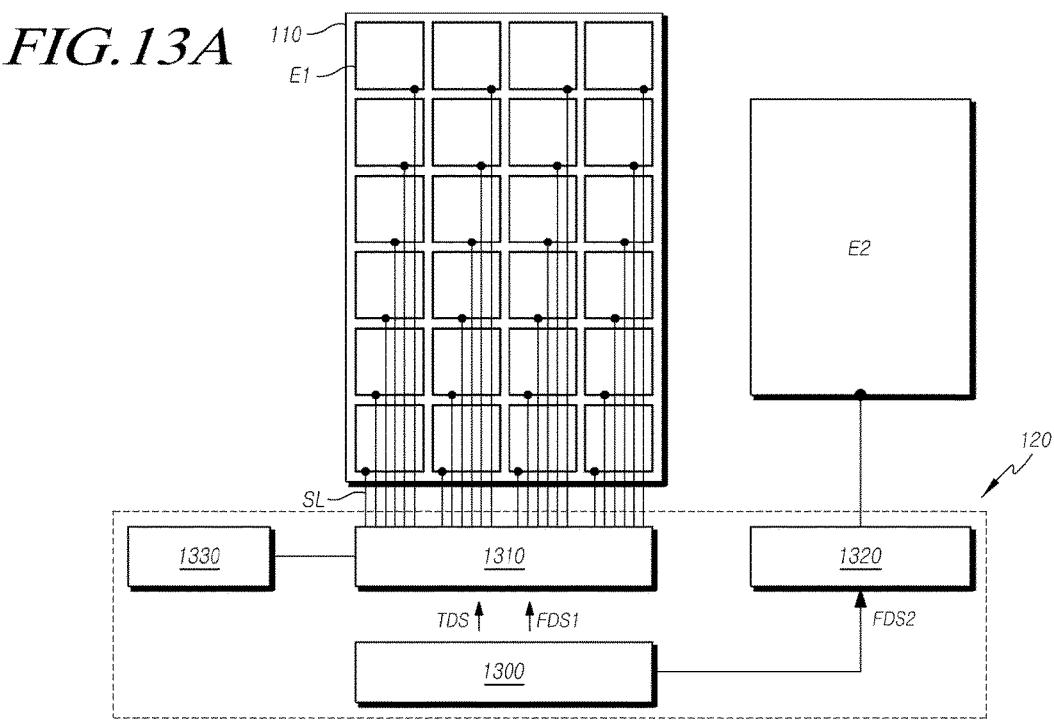
FIG. 13A and FIG. 13B illustrate the driving circuit of the touch display device 100 according to the present embodiments.
Figure 13B:
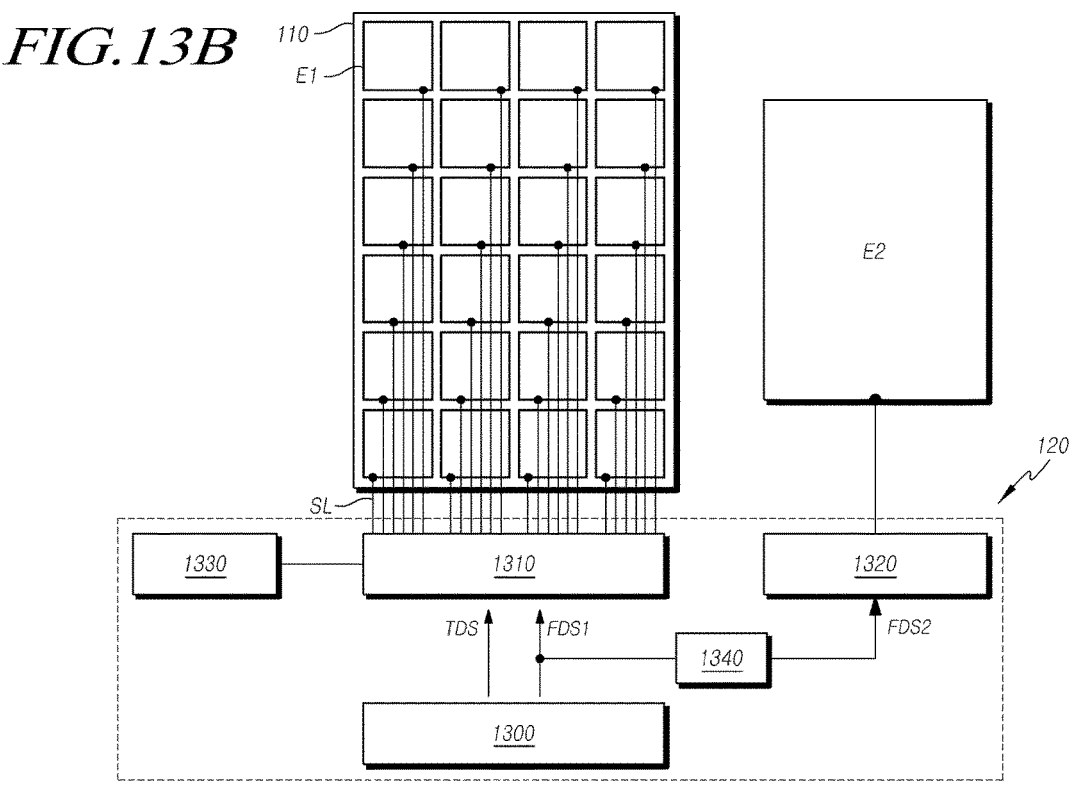

FIG. 13A and FIG. 13B illustrate the driving circuit 120 of the touch display device 100 according to the present embodiments.

Referring to FIG. 13A and FIG. 13B, the driving circuit 120 of the touch display device 100 according to the present embodiments is a circuit able to improve both the touch sensing function and the force sensing function.

The driving circuit 120 includes a signal generating circuit 1300, a first electrode driving circuit 1310, a second electrode driving circuit 1320, and a detection processor 1330.

The signal generating circuit 1300 generates and outputs a touch driving signal TDS and a first force driving signal FDS1.

FIG. 13A and FIG. 13B illustrate two driving circuits 120 depending on whether or not a second force driving signal FDS2 is generated by the signal generating circuit 1300.

Specifically, FIG. 13A illustrates the driving circuit 120 in which the signal generating circuit 1300 generates and outputs not only the touch driving signal TDS and the first force driving signal FDS1, but also the second force driving signal FDS2. FIG. 13B illustrates the driving circuit 120 in which the signal generating circuit 1300 generates and outputs the touch driving signal TDS and the first force driving signal FDS1 without generating the second force driving signal FDS2.

In a touch driving period T, the first electrode driving circuit 1310 receives the touch driving signal TDS from the signal generating circuit 1300 and sequentially applies the touch driving signal TDS to at least one first electrode among the plurality of first electrodes E1. In a force driving period F, the first electrode driving circuit 1310 receives the first force driving signal FDS1 from the signal generating circuit 1300 and applies the first force driving signal FDS1 to at least one first electrode among the plurality of first electrodes E1.

The first electrode driving circuit 1310 includes an integrator 830 and an analog-digital converter ADC, as illustrated in FIG. 8A.

In the force driving period F, the second electrode driving circuit 1320 applies the second force driving signal FDS2 to the second electrode E2 positioned outside the display panel 110.

The use of the above-described driving circuit 120 enables not only the touch sensing function of determining whether or not the screen is touched and/or detecting a touch point, but also the force sensing function of determining the presence and/or amount of touch force.

Referring to FIG. 13A, the signal generating circuit 1300 can also generate and output the second force driving signal FDS2. Then, the second electrode driving circuit 1320 transfers the second force driving signal FDS2, output from the signal generating circuit 1300, to the second electrode E2.

As described above, since the signal generating circuit 1300 generates and outputs not only the first force driving signal FDS1, but also the second force driving signal FDS2, the use of the second force driving signal FDS2 different from the first force driving signal FDS1 facilitates the force driving operation.

Referring to FIG. 13B, since the signal generating circuit 1300 does not generate the second force driving signal FDS2, the driving circuit 120 further includes a signal converter 1340 that generates the second force driving signal FDS2 by converting at least one of the amplitude, the phase, and the like of the first force driving signal FDS1 generated by the signal generating circuit 1300.

With this configuration, the signal generating circuit 1300 is required only to generate the first force driving signal FDS1. The signaling load of the signal generating circuit 1300 is reduced. For the purpose of effective force driving and force sensing, the second force driving signal FDS2 matching the first force driving signal FDS1 can be generated.

For example, the signal converter 1340 may include a level shifter to adjust the voltage level of a signal, may include a phase controller to control the phase of a signal, and/or may include a DA converter to convert a DC signal to an AC signal (e.g. a pulse signal) or an AD converter to convert an AC signal (e.g. a pulse signal) to a DC signal. The signal converter 1340 may be implemented as the second electrode driving circuit 1320 or may be included in the second electrode driving circuit 1320.

In the touch driving period T, the first electrode driving circuit 1310 receives a touch sensing signal generated in response to the touch driving signal TDS, and generates digital data from the received signal. The detection processor 1330 receives the digital data and determines whether or not the screen is touched and detects a touch position from the digital data.

In the force driving period F, the first electrode driving circuit 1310 receives a touch sensing signal generated in response to the force driving signals FDS1 and FDS2, and generates digital data from the received signal. The detection processor 1330 receives the digital data and detects a level of touch force from the digital data.

The detection processor 1330 may be a component corresponding to the processor 840 in FIG. 8A and FIG. 8B, and may be a micro controller unit (MCU).

As described above, the detection processor 1330 performs not only the touch sensing function but also the force sensing function by receiving data from the first electrode driving circuit 1310 that corresponds to signals from the first electrodes E1, whereby the two sensing functions can be efficiently performed using the same processing method.

The signal generating circuit 1300 may be implemented as a power integrated circuit (IC).

The signal generating circuit 1300 and the first electrode driving circuit 1310 may be included in a single IC. In some cases, the signal generating circuit 1300, the first electrode driving circuit 1310, and the detection processor 1330 may be included in a single IC.

Figure 14A:
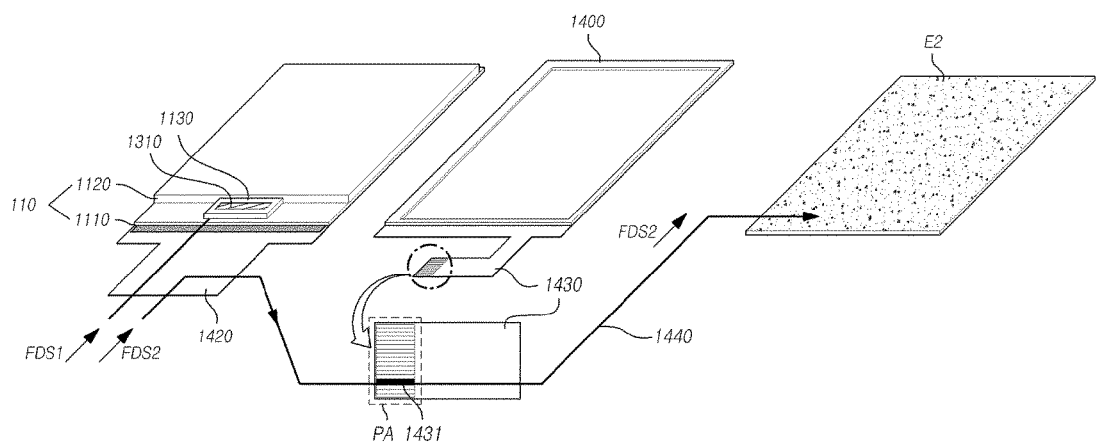
FIG. 14A and FIG. 14B illustrate signal supply structures of the touch display device 100 according to the present embodiments.
Figure 14B:
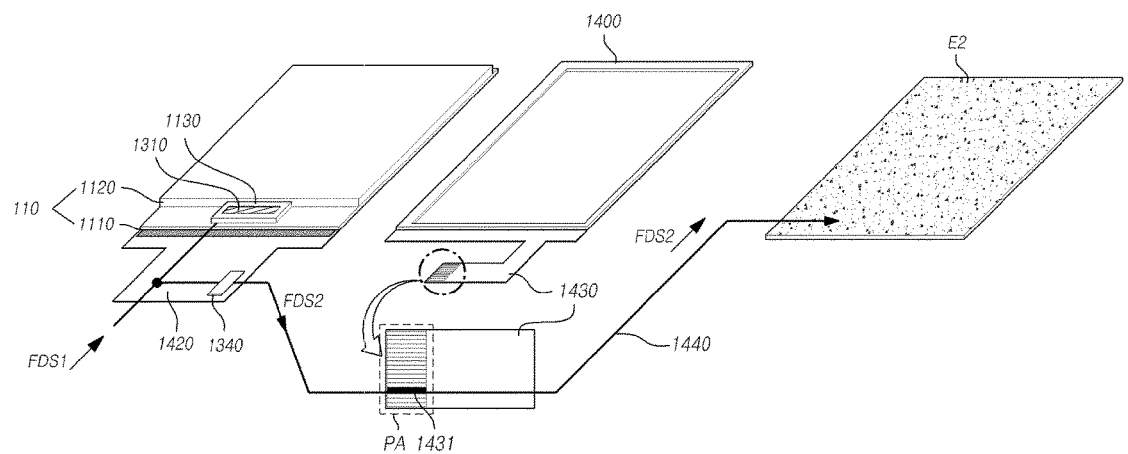

FIG. 14A and FIG. 14B illustrate signal supply structures of the touch display device 100 according to the present embodiments.

FIG. 14A and FIG. 14B illustrate the touch display device 100, in which the lower structure 1100 is a backlight unit 1400, including a first printed circuit 1420 and a second printed circuit 1430. The first printed circuit 1420 transfers signals to the display panel 110, and the second printed circuit 1430 transfers signals to a backlight driver within the backlight unit 1400.

FIG. 14A is an exemplary embodiment of FIG. 13A, and FIG. 14B is an exemplary embodiment of FIG. 13B.

Referring to FIG. 14A and FIG. 14B, the second electrode driving circuit 1320 includes one or more of the printed circuits 1420 and 1430 electrically connecting the signal generating circuit 1300 and the second electrode E2, as a component for transferring a second force driving signal.

That is, the printed circuits 1420 and 1430 provided for the display driving operation can be used for the transfer of a force driving signal.

As described above, one or more of the printed circuits 1420 and 1430 can be used as the second electrode driving circuit 1320 to transfer the second force driving signal FDS2 in the force driving operation. Accordingly, it is unnecessary to form an additional circuit, and a compact signal transfer structure can be formed using one or more of the printed circuits 1420 and 1430.

More specifically, by way of example, referring to FIG. 14A and FIG. 14B, the first printed circuit 1420 receiving the first force driving signal FDS1 output from the signal generating circuit 1300 is connected to a peripheral portion of the display panel 110, whereby the first printed circuit 1420 is electrically connected to the driving chip 1130.

The first and second printed circuits 1420 and 1430 may be connected to each other using a pin contact method.

The second printed circuit 1430 has a terminal PA connected to the first printed circuit 1420.

The terminal PA of the second, flexible printed circuit 1430 has not only a pin to receive a signal for the driving of the backlight unit 1400, but also a touch force sensing driving pin 1431 to receive the second force driving signal FDS2 from the first printed circuit 1420.

The touch force sensing driving pin 1431 allows the second force driving signal FDS2 to be transferred from the first printed circuit 1420 to the second printed circuit 1430.

As described above, in order to transfer the second force driving signal FDS2, necessary for the driving of the second electrode E2 for the force sensing function, from the first printed circuit 1420 to the second printed circuit 1430, the first printed circuit 1420 and the second printed circuit 1430 are connected via the dedicated touch force sensing driving pin 1431 using the pin contact method. The first printed circuit 1420 and the second printed circuit 1430 can be easily connected, and signals can be accurately transferred.

The first printed circuit 1420 and the second printed circuit 1430 may be directly connected via contact terminals, or may be electrically connected via a connecting medium 1440, such as a wire, a conductive tape, or a conductive pattern electrode.

Hereinafter, reference will be made to points in time for the three driving operations (display driving, touch driving, and force driving) of the touch display device 100.

Figure 15:
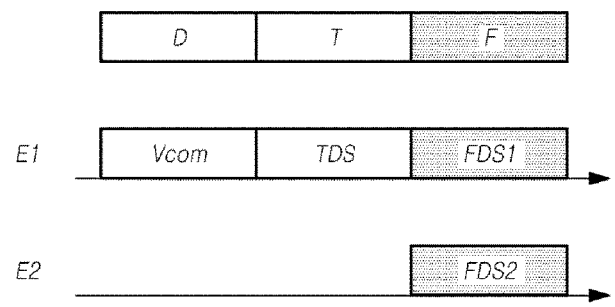
FIG. 15 illustrates three driving periods of the touch display device according to the present embodiments and signals applied to a first electrode and a second electrode depending on driving periods.

FIG. 15 illustrates three driving periods of the touch display device 100 according to the present embodiments and signals applied to a first electrode E1 and a second electrode E2 depending on driving periods.

Referring to FIG. 15, a display driving period D, a touch driving period T, and a force driving period F may be divided by time division.

In the display driving period D, the driving circuit 120 supplies a display driving voltage (e.g. a common voltage Vcom) to a plurality of first electrodes E1.

In the touch driving period T, the driving circuit 120 applies a touch driving signal TDS to at least one first electrode among the plurality of first electrodes E1.

In the force driving period F, the driving circuit 120 applies a first force driving signal FDS1 to at least one first electrode among the plurality of first electrodes E1 and applies a second force driving signal FDS2 to the second electrode E2.

Even in the case in which all of the first electrodes E1 are used for both the display driving operation, the touch driving operation, and the force driving operation, the display driving period D, the touch driving period T, and the force driving period F are divided and allocated by time division, such that the three driving operations (display driving, touch driving, and force driving) can be accurately performed without confusion or interference.

Hereinafter, exemplary methods of allocating the display driving period D, the touch driving period T, and the force driving period F to frame periods will be described.

Figure 16A:
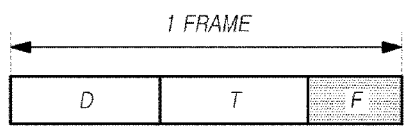
FIG. 16A to FIG. 16C illustrate a first method of allocating three driving periods in the touch display device according to the present embodiments.
Figure 16B:
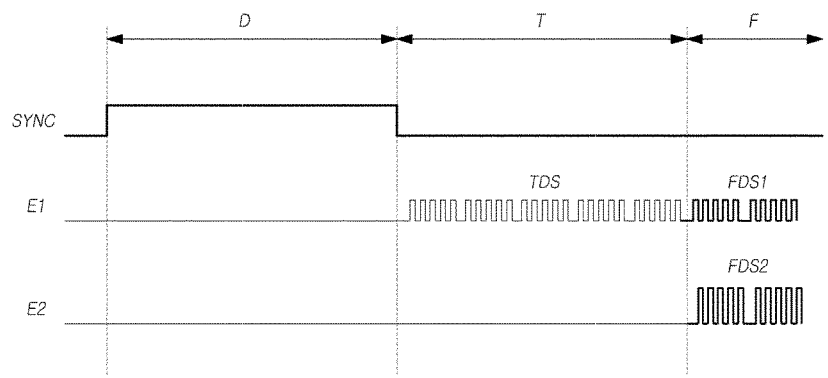
Figure 16C:
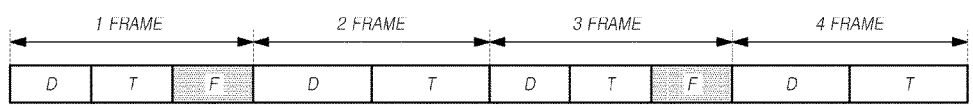

FIG. 16A to FIG. 16C illustrate a first method of allocating three driving periods in the touch display device 100 according to the present embodiments, and FIG. 17A to FIG. 17E illustrate a second method of allocating three driving periods in the touch display device 100 according to the present embodiments.

Referring to FIG. 16A to FIG. 16C, the first allocation method allocates one display driving period D and one touch driving period T to every frame period and allocates one force driving period F to at least every second frame period.

Referring to FIG. 16A, according to the first allocation method, in at least one frame period among a plurality of frame periods, one display driving period D, one touch driving period T, and one force driving period F are divided by time division.

Referring to FIG. 16B, one display driving period D, one touch driving period T, and one force driving period F are controlled based on a synchronization signal SYNC, provided from a controller (not shown) such as a timing controller to the driving circuit 120.

That is, the driving circuit 120 can perform the display driving operation, the touch driving operation, and the force driving operation in corresponding fractions of time, based on the synchronization signal SYNC received from the controller (not shown).

Referring to FIG. 16B, in the synchronization signal SYNC, a higher level fraction (or a lower level fraction) corresponds to the display driving period D, a lower level fraction (or a higher level fraction) corresponds to the touch driving period T.

In the synchronization signal SYNC, the force driving period F starts after the lapse of a fraction of time in which the lower level fraction defined as the touch driving period T.

Referring to FIG. 16B, the display driving period D, the touch driving period T, and the force driving period F are defined using the single synchronization signal SYNC.

Figure 17A:
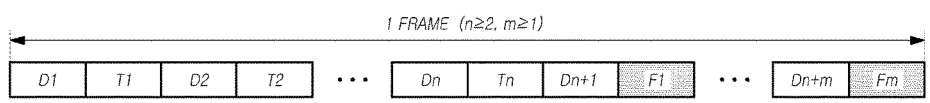
FIG. 17A to FIG. 17E illustrate a second method of allocating three driving periods in the touch display device according to the present embodiments.
Figure 17B:
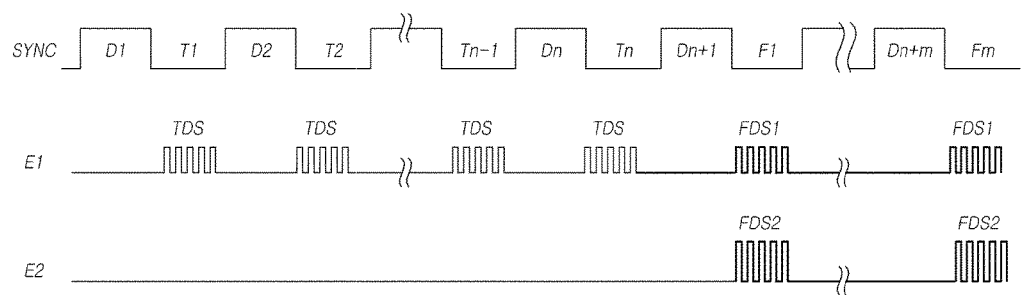
Figure 17C:
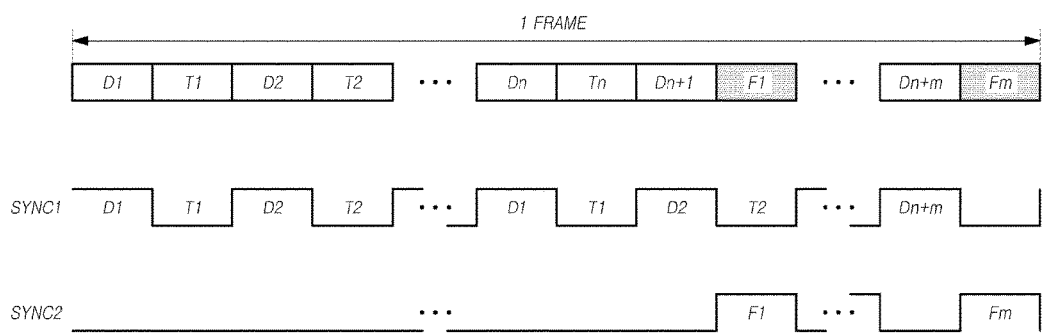

Alternatively, the display driving period D and the touch driving period T may be defined using a first synchronization signal, and the force driving signal F may be defined using a second synchronization signal (FIG. 17C).

As illustrated in FIG. 16C, the force sensing period F may not be present in every frame period but may be present in at least every second frame period.

In addition, in FIG. 16A to FIG. 16C, the orders of the display driving period D, the touch driving period T, and the force driving period F may be variously designed.

Furthermore, in FIG. 16A to FIG. 16C, one display driving period D, one touch driving period T, and two or more force driving periods F may be present in a single frame period.

For example, a single frame period may be designed in the order of the display driving period D, the force driving period F, and the touch driving period T.

Referring to FIG. 17A to FIG. 17E, the second allocation method allocates two or more display periods D and two or more touch driving periods T to every frame period and allocates one force driving period F to every or every second frame period.

Referring to FIG. 17A, in at least one frame period among a plurality of frame periods, at least n number of touch driving periods T1, T2, . . . , and Tn (where n is a natural number equal to or greater than 2) and m number of force driving periods F1, . . . , and Fm (where m is a natural number equal to or greater than 1) are divided by time division.

Referring to FIG. 17B, for example, n+m number of display driving periods D1, D2, . . . , Dn, Dn+1, . . . , and Dn+m, at least n number of touch driving periods T1, T2, . . . , and Tn, and m number of force driving periods F1, . . . , and Fm in a single frame period are controlled based on a synchronization signal SYNC.

Referring to FIG. 17C, in a single frame period, n+m number of display driving periods D1, D2, . . . , Dn, Dn+1, . . . , and Dn+m and at least n number of touch driving periods T1, T2, . . . , and Tn are controlled based on a first synchronization signal SYNC1, and m number of force driving periods F1, . . . , and Fm are controlled based on a second synchronization signal SYNC2.

Figure 17D:
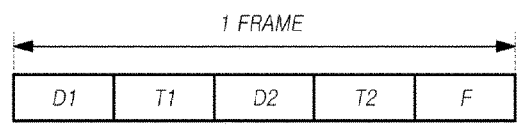

FIG. 17D illustrates a case in which two display driving periods D1 and D2 and two touch driving periods T1 and T2 alternate in a single frame period and one force driving period F is present in the last part of the frame period.

Here, the force driving period F may be positioned any location between the two display driving periods D1 and D2 and the two touch driving periods T1 and T2 (e.g. "D1, T1, D2, T2, F", "D1, T1, D2, F, T2", and "D1, T1, F, D2, T2").

Figure 17E:
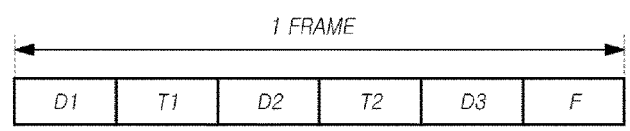

FIG. 17E illustrates a case in which three display driving periods D1, D2, and D3 and two touch driving periods T1 and T2 alternate in a single frame period and one force driving period F is present in the last part of the frame period.

Here, the force driving period F may be positioned any location between the three display driving periods D1, D2, and D3 and the two touch driving periods T1 and T2 (e.g. "D1, T1, D2, T2, D3, F", "D1, T1, D2, T2, F, D3", "D1, T1, D2, F, T2, D3", and "D1, T1, F, D2, T2, D3").

Referring to FIG. 16A to FIG. 16C and FIG. 17A to FIG. 17E, one frame period includes at least one display driving period D. One or more touch driving periods T are present in every frame period. That is, the display driving period D can be present in every frame period. Although one or more touch driving periods T may be present in every frame period as illustrated in the drawings, one or more touch driving periods T may be present in at least every second frame period instead of being present in every frame period.

Referring to FIG. 16A to FIG. 16C and FIG. 17A to FIG. 17E, one or more force driving periods F are present in at least every second frame period.

A driving frequency for touch driving and a driving frequency for force driving may be lower than a driving frequency for display driving.

In addition, the touch display device 100 operates in active mode when there is an external input (a user input, a data input, etc.) and operates in idle mode (also referred to as "sleep mode") when there is no external input.

When the touch display device 100 operates in the idle mode, it is possible to set driving frequencies for the display driving operation, the touch driving operation, and the force driving operation to be lower than the driving frequency of active mode in order to reduce power consumption.

As described above, when the display driving period D, the touch driving period T, and the force driving period F are divided in time, one allocation method can be selected from a variety of allocation methods for the display driving period D, the touch driving period T, and the force driving period F, by comprehensively considering display performance, touch sensing performance, and force sensing performance, whereby an optimum driving method can be designed.

In the touch driving period T, when a touch driving signal TDS is applied to one first electrode of the first electrodes E1, a parasitic capacitance may be formed between the first electrode E1 and an adjacent electrode or portion.

For example, a parasitic capacitance may be formed between the first electrode E1 and a data line, may be formed between the first electrode E1 and a gate line, or may be formed between the first electrode E1 and another first electrode E1. In addition, a parasitic capacitance may be formed between the first electrode E1 and the second electrode E2.

When a touch is sensed based on a change in the capacitance between the first electrode E1 and the pointer, a parasitic capacitance formed between the first electrode E1 and the adjacent electrode may significantly lower the accuracy of touch sensing, as described above.

In order to overcome this problem, the touch display device 100 according to the present embodiments may operate with no load (load-free driving).

The load-free driving is a method of driving the surrounding electrode(s) of the first electrode in order to prevent a parasitic capacitance from being formed between the first electrode E1 and the surrounding electrode(s).

Figure 18A:
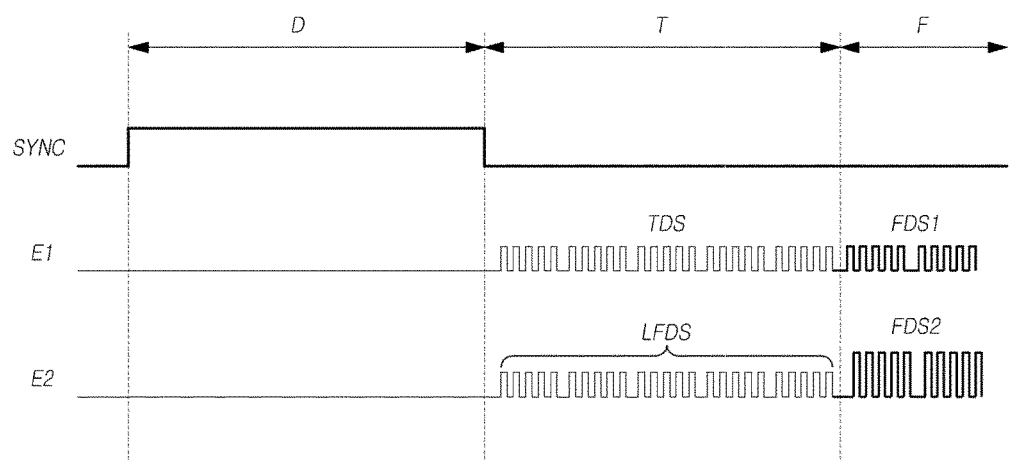
FIG. 18A and FIG. 18B illustrate load-free driving of the touch display device according to the present embodiments.
Figure 18B:
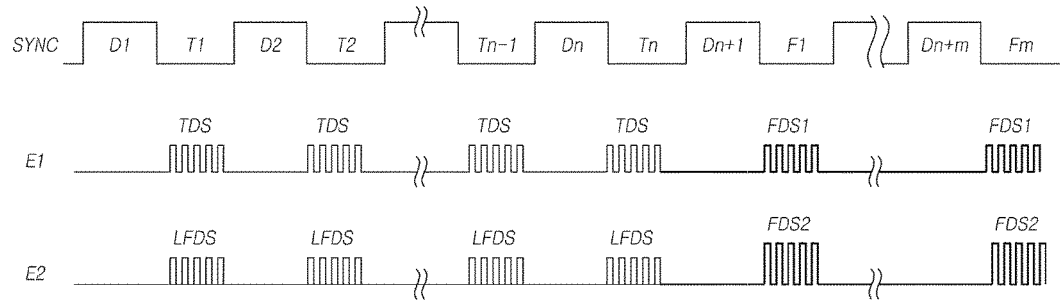

FIG. 18A and FIG. 18B illustrate load-free driving of the touch display device 100 according to the present embodiments.

Referring to FIG. 18A and FIG. 18B, when the driving circuit 120 sequentially applies a touch driving signal TDS to at least one first electrode among the plurality of first electrodes E1 in a touch driving period T, a touch driving signal TDS or a load-free driving signal LFDS may be applied to the second electrode E2, the load-free driving signal being in-phase with the touch driving signal TDS.

The load-free driving signal LFDS may be a touch driving signal TDS simultaneously applied to the first electrode E1 and the second electrode E2.

Alternatively, the load-free driving signal LFDS may be a separate signal in-phase with the touch driving signal TDS. In this case, the load-free driving signal LFDS and the touch driving signal TDS may have the same voltage and the same amplitude.

Thus, as described above, when the touch driving signal TDS is applied to the first electrode E1 in the touch driving period T, an application of the touch driving signal TDS or the load-free driving signal LFDS, in-phase with the touch driving signal TDS, to the second electrode E2 can prevent a parasitic capacitance from being formed between the first electrode E1 and the second electrode E2. This can consequently improve the accuracy of touch sensing.

As described above, when the touch driving signal TDS is applied to the first electrode E1 in the touch driving period T, the touch driving signal TDS or the load-free driving signal LFDS, in-phase with the touch driving signal TDS, may be applied to the entire data lines or the surrounding data line(s).

When the touch driving signal TDS is applied to the first electrode E1 in the touch driving period T, the touch driving signal TDS or the load-free driving signal LFDS, in-phase with the touch driving signal TDS, may be applied to the entire gate lines or the surrounding gate line(s).

When the touch driving signal TDS is applied to the first electrode E1 in the touch driving period T, the touch driving signal TDS or the load-free driving signal LFDS, in-phase with the touch driving signal TDS, may be applied to the entire first electrodes E1 or the surrounding first electrode(s) E1.

Figure 19:
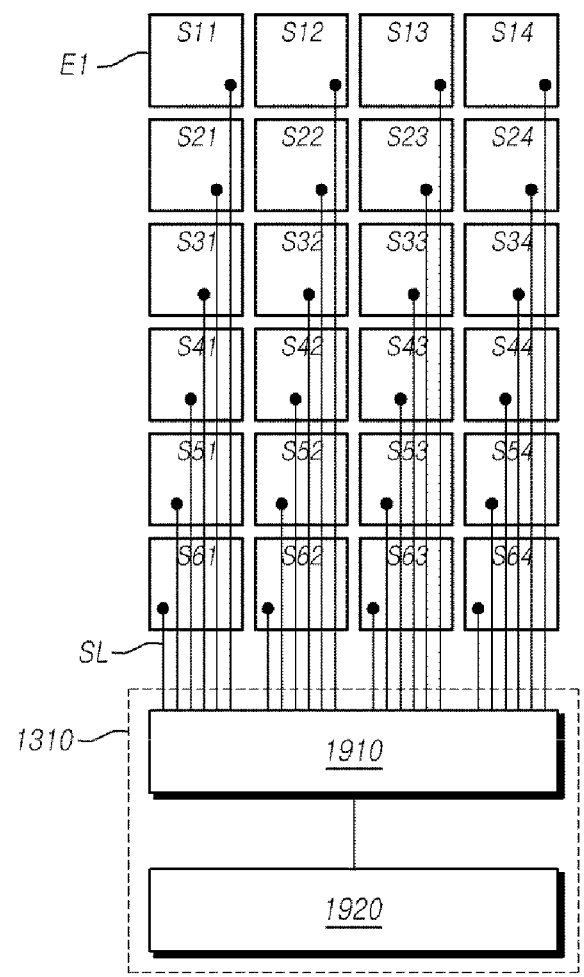
FIG. 19 illustrates a switch circuit and a signal detection circuit of the first electrode driving circuit in the driving circuit of the touch display device according to the present embodiments.
Figure 20:
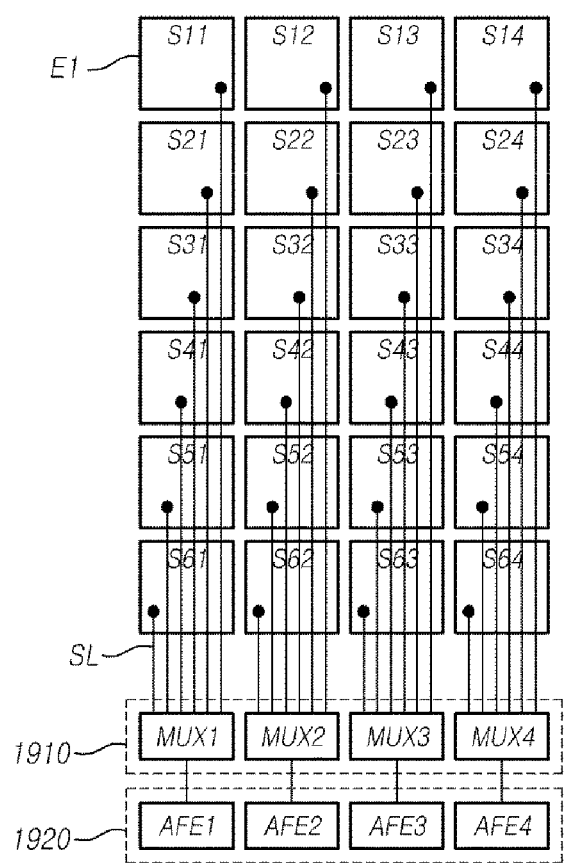
FIG. 20 illustrates exemplary embodiments of the switch circuit and the signal detection circuit of the first electrode driving circuit in the driving circuit of the touch display device according to the present embodiments.

FIG. 19 illustrates a switch circuit 1910 and a signal detection circuit 1920 of the first electrode driving circuit 1310 in the driving circuit 120 of the touch display device 100 according to the present embodiments, and FIG. 20 illustrates exemplary embodiments of the switch circuit 1910 and the signal detection circuit 1920 of the first electrode driving circuit 1310 in the driving circuit 120 of the touch display device 100 according to the present embodiments.

Referring to FIG. 19, in order to selectively supply a display driving voltage (e.g. Vcom), a touch driving signal TDS, and a first force driving signal FDS1 to the first electrodes E1 according to the three driving periods D, T, and F, the first electrode driving circuit 1310 includes the switch circuit 1910 and the signal detection circuit 1920. The switch circuit 1910 selects all or some of signal lines SL connected to the plurality of first electrodes E1 as a signal line SL through which the display driving voltage (e.g. Vcom), the touch driving signal TDS, and the first force driving signal FDS1 are supplied. The signal detection circuit 1920 detects signals through the first electrodes E1 connected to the switch circuit 1910.

The switch circuit 1910 includes one or more multiplexers.

The signal detection circuit 1920 includes one or more analog front ends (AFEs).

As illustrated in FIG. 19 and FIG. 20, twenty-four first electrodes E1 (S11, S12, S13, S14, S21, S22, S23, S24, ..., S61, S62, S63, and S64) are arranged in a matrix of six rows and four columns. In the interests of driving efficiency, for example, the switch circuit 1910 includes four multiplexers MUX1, MUX2, MUX3, and MUX4, and the signal detection circuit 1920 includes four analog front ends AFE1, AFE2, AFE3, and AFE4.

Figure 21A:
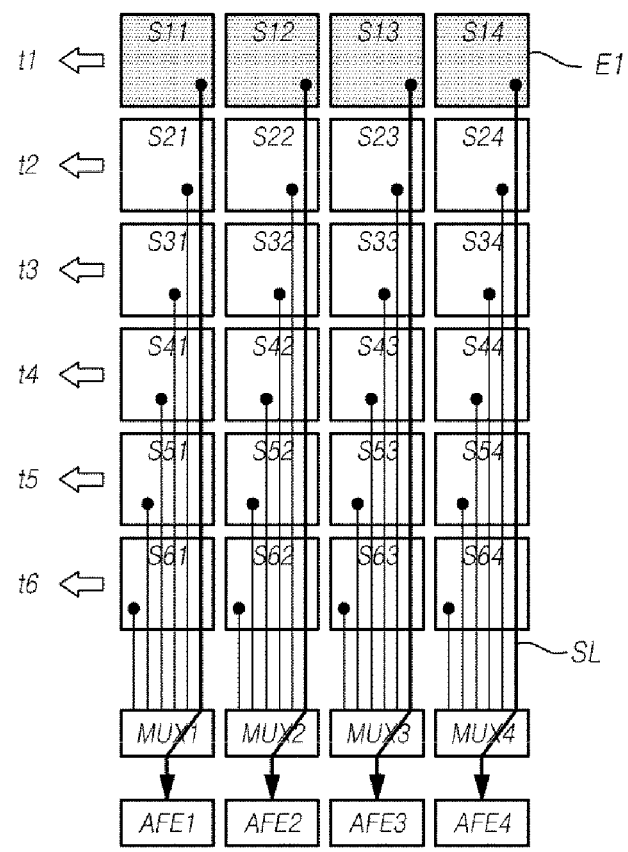
FIG. 21A to FIG. 21C illustrate signal detection processing for touch sensing and force sensing of the touch display device according to the present embodiments.
Figure 21B:
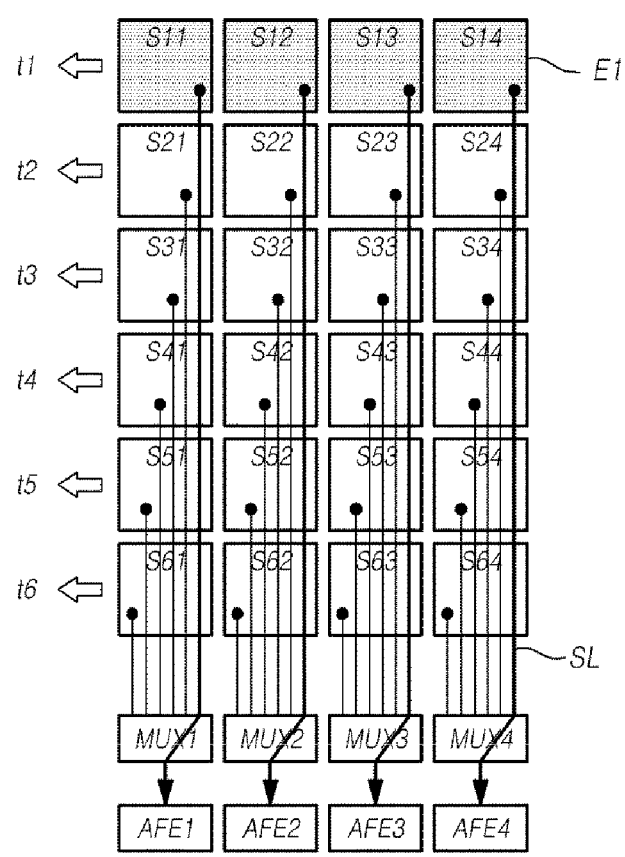
Figure 21C:
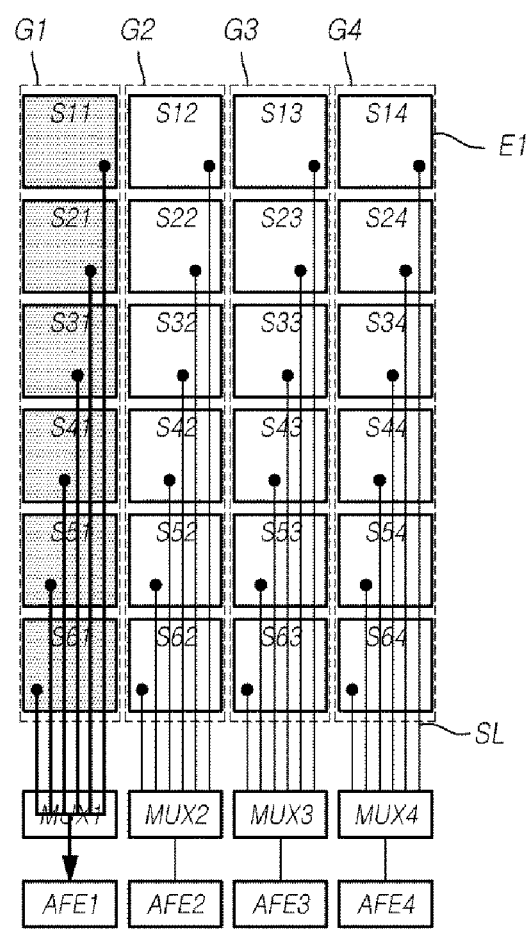

FIG. 21A to FIG. 21C illustrate the signal detection processing for touch sensing and force sensing of the touch display device according to the present embodiments.

Referring to FIG. 21A, in the touch driving operation, at a point in time t1, a touch driving signal TDS is simultaneously applied to the four first electrodes S11, S12, S13, and S14 in the first row through the four multiplexers MUX1, MUX2, MUX3, and MUX4, and the four analog front ends AFE1, AFE2, AFE3, and AFE4 detect an incoming signal through the four first electrodes S11, S12, S13, and S14 in the first row.

In the same manner, at a point in time t2, a touch driving signal TDS is simultaneously applied to the four first electrodes S21, S22, S23, and S24 in the second row through the four multiplexers MUX1, MUX2, MUX3, and MUX4, and the four analog front ends AFE1, AFE2, AFE3, and AFE4 detect an incoming signal through the four first electrodes S21, S22, S23, and S24 in the second row.

Likewise, at a point in time t3, the four first electrodes S31, S32, S33, and S33 in the third row are subjected to touch driving and signal sensing. At a point in time t4, the four first electrodes S41, S42, S43, and S43 in the fourth row are subjected to touch driving and signal sensing. At a point in time t5, the four first electrodes S51, S52, S53, and S53 in the fifth row are subjected to touch driving and signal sensing. In addition, at a point in time t6, the four first electrodes S61, S62, S63, and S63 in the sixth row are subjected to touch driving and signal sensing.

Touch sensing may be performed based on all incoming signals detected using the above-described method.

Referring to FIG. 21B, in the force driving period, at a point in time t1, a first force driving signal FDS1 is simultaneously applied to the four first electrodes S11, S12, S13, and S14 in the first row through the four multiplexers MUX1, MUX2, MUX3, and MUX4, and the four analog front ends AFE1, AFE2, AFE3, and AFE4 detect an incoming signal (force data) through the four first electrodes S11, S12, S13, and S14 in the first row.

In the same manner, at a point in time t2, a first force driving signal FDS1 is simultaneously applied to the four first electrodes S21, S22, S23, and S24 in the second row through the four multiplexers MUX1, MUX2, MUX3, and MUX4, and the four analog front ends AFE1, AFE2, AFE3, and AFE4 detect an incoming signal through the four first electrodes S21, S22, S23, and S24 in the second row.

Likewise, at a point in time t3, the four first electrodes S31, S32, S33, and S33 in the third row are subjected to force driving and signal sensing. At a point in time t4, the four first electrodes S41, S42, S43, and S43 in the fourth row are subjected to force driving and signal sensing. At a point in time t5, the four first electrodes S51, S52, S53, and S53 in the fifth row are subjected to force driving and signal sensing. In addition, at a point in time t6, the four first electrodes S61, S62, S63, and S63 in the sixth row are subjected to force driving and signal sensing.

As described above, force sensing may be performed based on all incoming signals detected during force driving at the points in time t1 to t6.

That is, in the force driving period F, the driving circuit 120 can sense a level of touch force by determining a change in the capacitance between each of the first electrodes E1 and the second electrode E2, based on the signals received from the first electrodes E1.

As described above, the entire changes in the capacitance formed between the first electrodes E1 and the second electrode E2 are determined, such that precise force sensing can be performed.

Referring to FIG. 21C, for the purpose of force driving and sensing efficiency, the twenty-four first electrodes E1 (S11, S12, S13, S14, S21, S22, S23, S24, . . . , S61, S62, S63, and S64), arranged in six rows and four columns, are grouped in columns. In this case, the twenty-four first electrodes E1 (S11, S12, S13, S14, S21, S22, S23, S24, . . . , S61, S62, S63, and S64) are grouped into four groups of first electrodes G1, G2, G3, and G4.

With this configuration, the six signal lines SL connected to the six first electrodes S11, S21, . . . , S61 of the first group of first electrodes G1 in the first column are electrically connected by means of the first multiplexer MUX1.

Thus, in the force driving period F, a first force driving signal FDS1 is simultaneously applied to the six first electrodes S11, S21, . . . , S61 of the first group of first electrodes G1 in the first column.

In the same manner, the first force driving signal FDS1 is simultaneously applied to the six first electrodes S12, S22, . . . , and S62 of the second group of first electrodes G2 in the second column. Likewise, the first force driving signal FDS1 is simultaneously applied to the six first electrodes S13, S23, . . . , and S63 of the third group of first electrodes G3 in the third column. In addition, the first force driving signal FDS1 is simultaneously applied to the six first electrodes S14, S24, . . . , and S64 of the fourth group of first electrodes G4 in the fourth column.

Consequently, the first force driving signal FDS1 can be simultaneously applied to the twenty-four first electrodes E1 (S11, S12, S13, S14, S21, S22, S23, S24, . . . , S61, S62, S63, and S64).

The force driving time can be reduced to about ⅙ compared to the case in FIG. 21b.

In addition, the six signal lines SL, connected to the six first electrodes S11, S21, . . . , and S61 of the first group of first electrodes G1 in the first column due to column grouping, are electrically connected by means of the first multiplexer MUX1.

Thus, the analog front end AFE1 can detect a signal received from the first group of first electrodes G1 including the six first electrodes S11, S21, . . . , and S61 arranged in the first column.

In this manner, the second analog front end AFE2 can detect a signal received from the second group of first electrodes G2 including the six first electrodes S12, S22, . . . , and S62 arranged in the second row. The third analog front end AFE3 can detect a signal received from the third group of first electrodes G3 including the six first electrodes S13, S23, . . . , and S63 arranged in the third row. In addition, the fourth analog front end AFE4 can detect a signal received from the fourth group of first electrodes G4 including the six first electrodes S14, S24, . . . , and S64 arranged in the fourth row.

Signal detection using the four analog front ends AFE1, AFE2, AFE3, and AFE4 can be simultaneously performed. Thus, signal detection time can be reduced to about ⅙ compared to the case in FIG. 21b.

After the signal detection, in the force driving period F, the driving circuit 120 can sense a level of touch force by determining changes in the capacitance between the groups of first electrodes G1, G2, G3, and G4 and the second electrode E2, based on a signal received from the groups of first electrodes G1, G2, G3, and G4.

Figure 22:
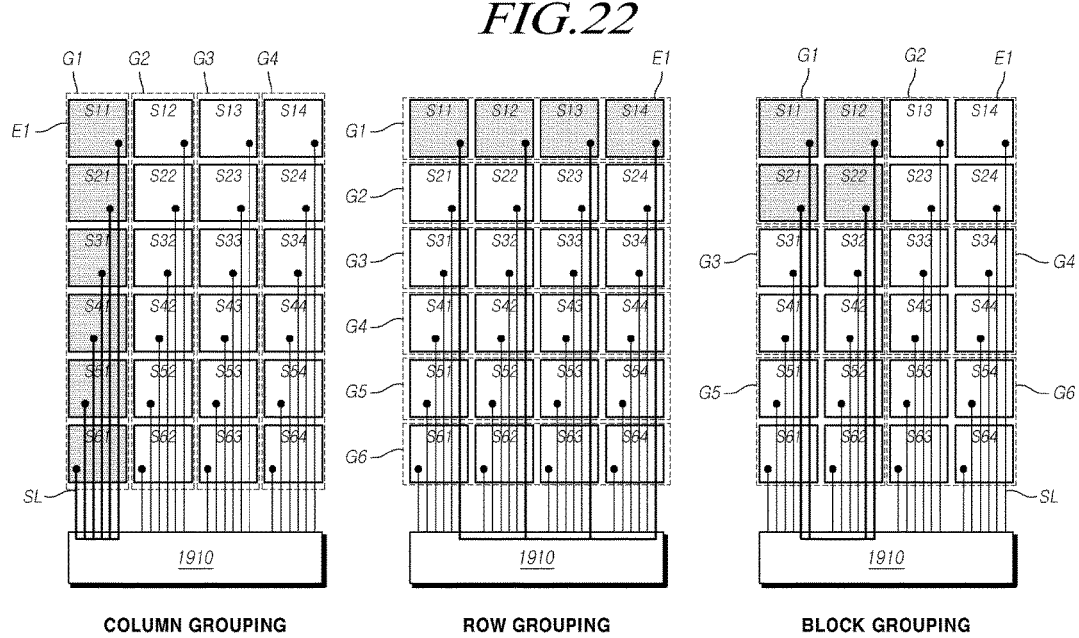
FIG. 22 illustrates exemplary grouping of first electrodes for the purpose of efficient force sensing in touch display device according to the present embodiments.

FIG. 22 illustrates exemplary grouping of first electrodes for the purpose of efficient force sensing in touch display device 100 according to the present embodiments.

FIG. 22 illustrates exemplary cases of grouping first electrodes as in FIG. 21C.

Referring to FIG. 22, the cases of grouping first electrodes include column grouping in which first electrodes arranged in a single column are grouped into a group of first electrodes, row grouping in which first electrodes arranged in a single row are grouped into a group of first electrodes, and block grouping in which adjacent first electrodes are grouped into a group of first electrodes.

According to such grouping of first electrodes, in the force driving period F, the driving circuit 120 can sense a level of touch force by determining changes in the capacitance between the groups of first electrodes and the second electrode E2, based on a signal received from the groups of first electrodes respectively including two or more first electrodes E1.

When the precision of force sensing is not required to be high compared to that of touch sensing, it is possible to significantly reduce the force sensing time through such grouping of first electrodes.

Figure 23:
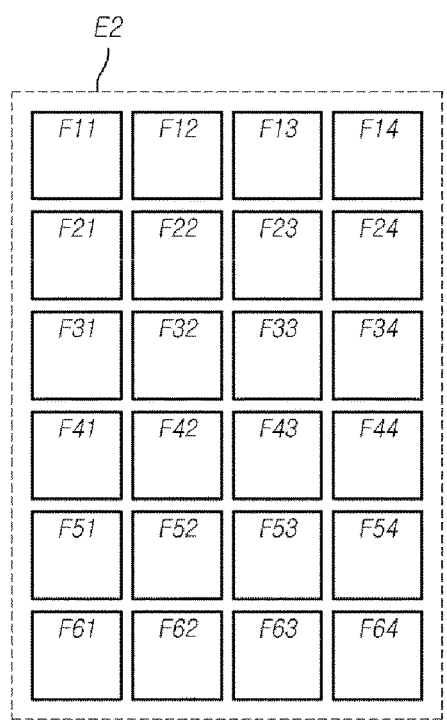
FIG. 23 illustrates an exemplary second electrode composed of two or more split electrodes in the touch display device according to the present embodiments.

FIG. 23 illustrates an exemplary second electrode E2 composed of two or more split electrodes F11, F12, F13, . . . , and F64 in the touch display device 100 according to the present embodiments.

Referring to FIG. 23, the second electrode E2 may be a single electrode plate or may include two or more split electrodes F11, F12, F13, . . . , and F64. Here, the second electrode E2 is one of force sensors, to which a second force driving signal FDS2 is applied.

The use of the second electrode E2, including the two or more split electrodes F11, F12, F13, . . . , and F64, makes it possible to control a force driving area and a force sensing area, to detect a location where a level of touch force is formed, or to determine a position-specific amount of touch force depending.

The number into which the second electrode E2 is split, i.e. the number of the split electrodes, may be smaller than, equal to, or greater than the number of the first electrodes E1.

The number of the split electrodes may be determined considering the efficiency of force driving, the precision of force sensing, etc.

For the sake of brevity, the second electrode E2 is assumed to include twenty-four split electrodes.

Then, the positions of the twenty-four first electrodes E1 (S11, S12, S13, S14, S21, S22, S23, S24, . . . , S61, S62, S63, and S64) correspond to the positions of the twenty-four split electrodes F11, F12, F13, F14, F21, F22, F23, F24, . . . , F61, F62, F63, and F64 of the second electrode E2.

Figure 24:
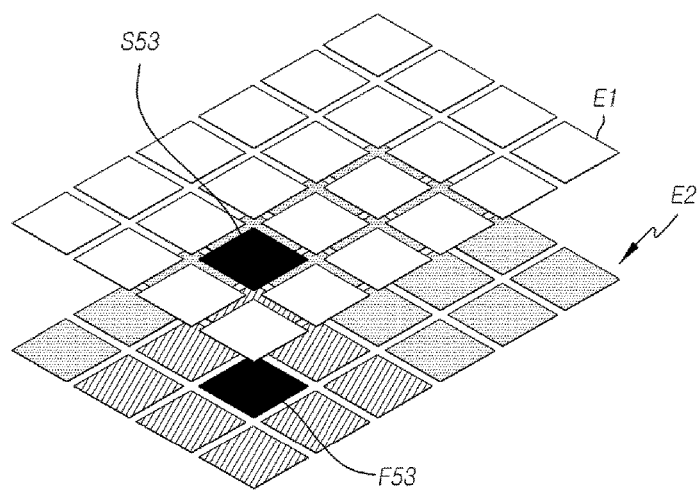
FIG. 24 illustrates a method of driving the second electrode composed of split electrodes in the touch display device according to the present embodiments.
Figure 25A:
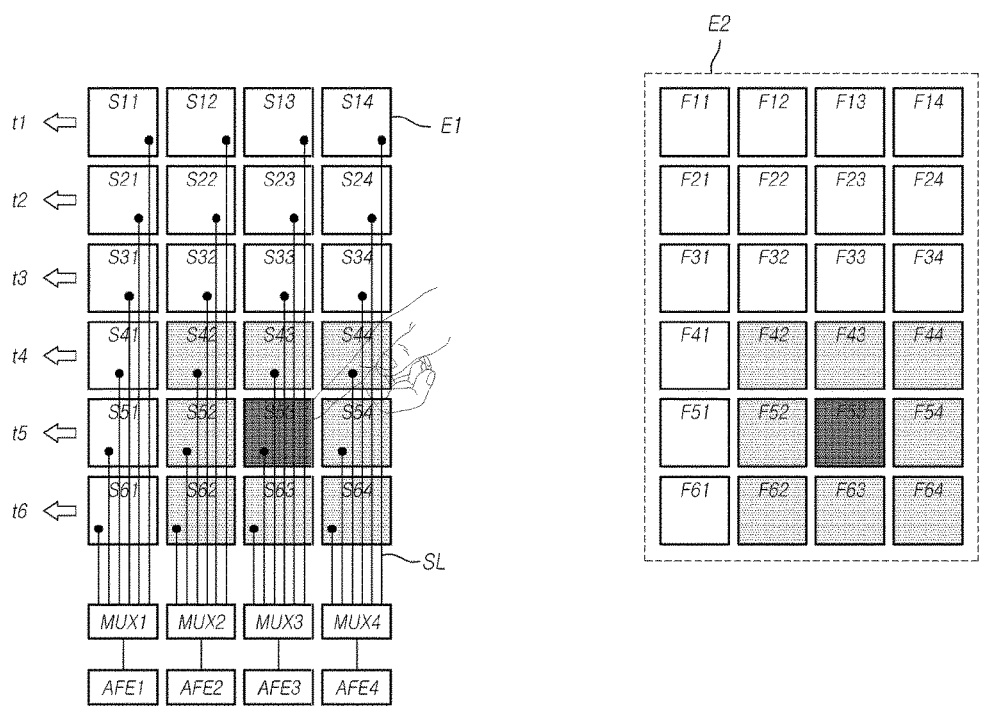
FIG. 25A and FIG. 25B illustrate exemplary partial driving of the second electrode in the touch display device according to the present embodiments.
Figure 25B:
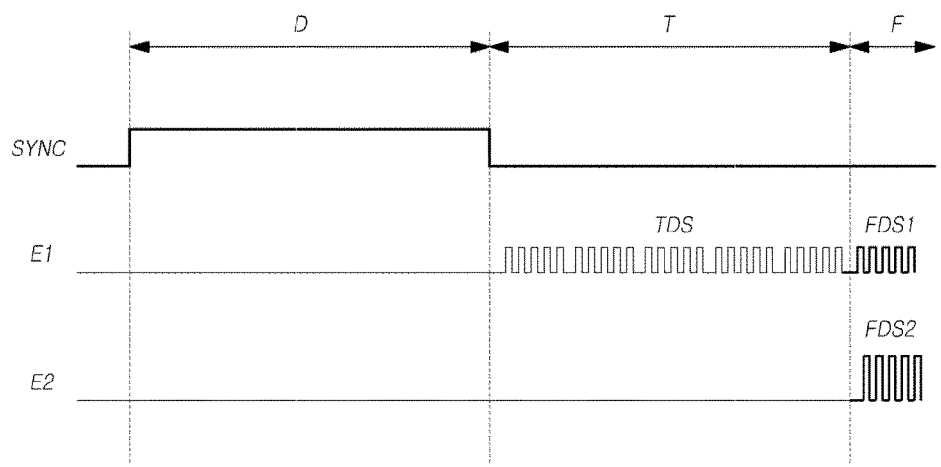

FIG. 24 illustrates a method of driving the second electrode E2 composed of split electrodes in the touch display device 100 according to the present embodiments, FIG. 25A and FIG. 25B illustrate exemplary partial driving of the second electrode E2 in the touch display device 100 according to the present embodiments.

Referring to FIG. 24, when the second electrode E2 is composed of the split electrodes, the second electrode may be partially driven in order to reduce power consumption and reduce processing time required for force driving and force sensing.

Referring to FIG. 24, FIG. 25A, and FIG. 25B, it will be assumed, by way of example, that the twenty-four first electrodes E1 (S11, S12, S13, S14, S21, S22, S23, S24, . . . , S61, S62, S63, and S64) are arranged in six rows and four columns, as described above. In a touch driving period T, it will be assumed that a detected touch position corresponds to the first electrode S53 among the twenty-four first electrodes E1 (S11, S12, S13, S14, S21, S22, S23, S24, . . . , S61, S62, S63, and S64). In order to reduce power consumption and reduce processing time required for force driving and force sensing, partial driving may be performed to apply a second force driving signal FDS2 to the split electrode F53 of the second electrode E2 corresponding to the touch position, instead of applying the second force driving signal FDS2 to the entire twenty-four split electrodes F11, F12, F13, F14, F21, F22, F23, F24, . . . , F61, F62, F63, and F64 of the second electrode E2.

In such force driving, a first force driving signal FDS1 can be applied to only the first electrode S53 corresponding to the touch position, among the twenty-four first electrodes E1 (S11, S12, S13, S14, S21, S22, S23, S24, . . . , S61, S62, S63, and S64).

In such partial force driving, expanded partial force driving can be performed in order to improve the precision of force sensing.

Referring to FIG. 24, FIG. 25A, and FIG. 25B, for example, expanded partial force driving can be performed such that the second force driving signal FDS2 is applied not only to the split electrode F53 corresponding to the touch position, but also to the surrounding split electrodes F42, F43, F44, F52, F54, F62, F63, and F64.

In addition, expanded partial force driving can be performed such that the first force driving signal FDS1 is applied not only to the first electrode S53 corresponding to the touch position, among the twenty-four first electrodes E1 (S11, S12, S13, S14, S21, S22, S23, S24, . . . , S61, S62, S63, and S64), but also to the surrounding first electrodes S42, S43, S44, S52, S54, S62, S63, and S64.

Hereinafter, partial force driving as described above will be described again.

In the force driving period F, the driving circuit 120 can apply a second force driving signal FDS2 to a specific split electrode (e.g. F53) among the two or more split electrodes F11, F12, F13, . . . , and F64 of the second electrode E2, corresponding to a touch position detected in the touch driving period T.

Such split driving for the second electrode E2 can reduce power consumption and reduce processing time required for force driving and force sensing.

In the force driving period F, split driving for the second electrode E2 can be performed as follows: When the driving circuit 120 applies a second force driving signal FDS2 to a specific split electrode (e.g. F53), the driving circuit 120 may apply the first force driving signal FDS1 to the entire first electrodes E1. In order to further reduce power consumption and processing time, the first force driving signal FDS1 may be applied to the first electrode S53 corresponding to the specific split electrode (e.g. F53) among the plurality of first electrodes E1, i.e. the first electrode S53 corresponding to the touch position.

Since split driving for the first electrode E1 is performed together with split driving for the second electrode E2 in the force driving period F, power consumption and processing time required for force driving and force sensing can be further reduced.

When partial force driving is performed using split driving for the second electrode E2, the precision of force sensing may be slightly lowered. In order to compensate for this problem, in the force driving period F, the driving circuit 120 applies the second force driving signal FDS2 to the specific split electrode F53 and the surrounding split electrodes F42, F43, F44, F52, F54, F62, F63, and F64 close to the specific split electrode F53.

Here, the driving circuit 120 may apply the first force driving signal FDS1 to the entire first electrodes E1 or may apply the first force driving signal FDS1 to specific first electrodes among the entire first electrodes E1, i.e. the first electrode S53 corresponding to the specific split electrode F53 and the first electrodes S42, S43, S44, S52, S54, S62, S63, S64 corresponding to the surrounding split electrodes F42, F43, F44, F52, F54, F62, F63, and F64 close to the specific split electrode F53.

As described above, expanded partial force driving is performed such that, among the two or more split electrodes of the second electrode E2, not only the specific split electrode corresponding to the touch position, but also the surrounding split electrodes are driven. This can consequently reduce power consumption and processing time, and improve the precision of force sensing to a desirable level.

As described above, partial force driving corresponds to spatial partial driving for the second electrode E2 when the second electrode E2 is spatially divided.

Alternatively, when the second electrode E is a single electrode plate instead of being composed of the split electrodes, temporal partial force driving can be provided in order to reduce power consumption.

For such temporal partial force driving, in the force driving period F, the driving circuit 120 can perform temporal partial driving for the second electrode E2 by applying a first force driving signal FDS1 to a specific first electrode E1 among the plurality of first electrodes E1, corresponding to a touch position detected in the touch driving period T, and applying a second force driving signal FDS2 to the second electrode E2 while applying the first force driving signal FDS1 to the specific first electrode E1.

Even in the case in which the second electrode E2 is a single electrode plate, temporal partial force driving as described above can reduce power consumption required for driving the second electrode E2 and reduce processing time for force sending.

Hereinafter, the above-described method of driving the touch display device 100 will be briefly described with referenced to FIG. 26.

Figure 26:
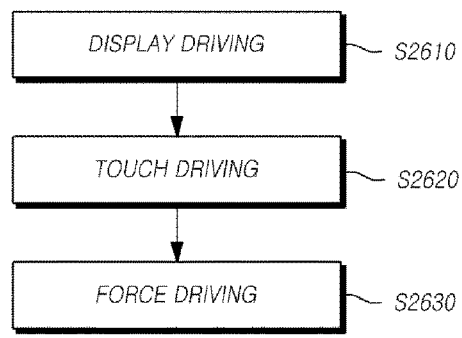
FIG. 26 is a flowchart illustrating the method of driving the touch display device according to the present embodiments.

FIG. 26 is a flowchart illustrating the method of driving the touch display device 100 according to the present embodiments.

Referring to FIG. 26, the method of driving the touch display device 100 according to the present embodiments includes: step S2610 of driving the display panel 110 in a display driving period D; step S2620 of determining whether or not the screen is touched and/or detecting a touch position in a touch driving period T by sequentially driving at least one first electrode among the plurality of first electrodes E1 disposed within the display panel 110; and step S2630 of detecting a level of touch force in a force driving period F by driving at least one first electrode among the plurality of first electrodes E1 and driving a second electrode E2, the gap G between the plurality of first electrodes E1 and the second electrode E2 changing depending on the amount of touch force.

In the display driving period D, a display driving voltage (e.g. Vcom) is applied to the plurality of first electrodes E1 disposed within the display panel 110.

A single frame period includes at least one display driving period D and at least one touch driving period T, which are divided by time division.

At least one force driving period F is present in at least every second frame period.

When the above-described driving method is used, even in the case in which the entire first electrodes E1 are used for the display driving, touch driving, and force driving, the display driving period D, the touch driving period T, and the force driving period F can be allocated by timing division, such that the three driving operations (display driving, touch driving, and force driving) can be accurately performed without confusion or interference.

FIG. 27 to FIG. 30 illustrate exemplary display driving ICs 2700, 2800, 2900, and 3000 of the touch display device 100 according to the present embodiments.

Figure 27:
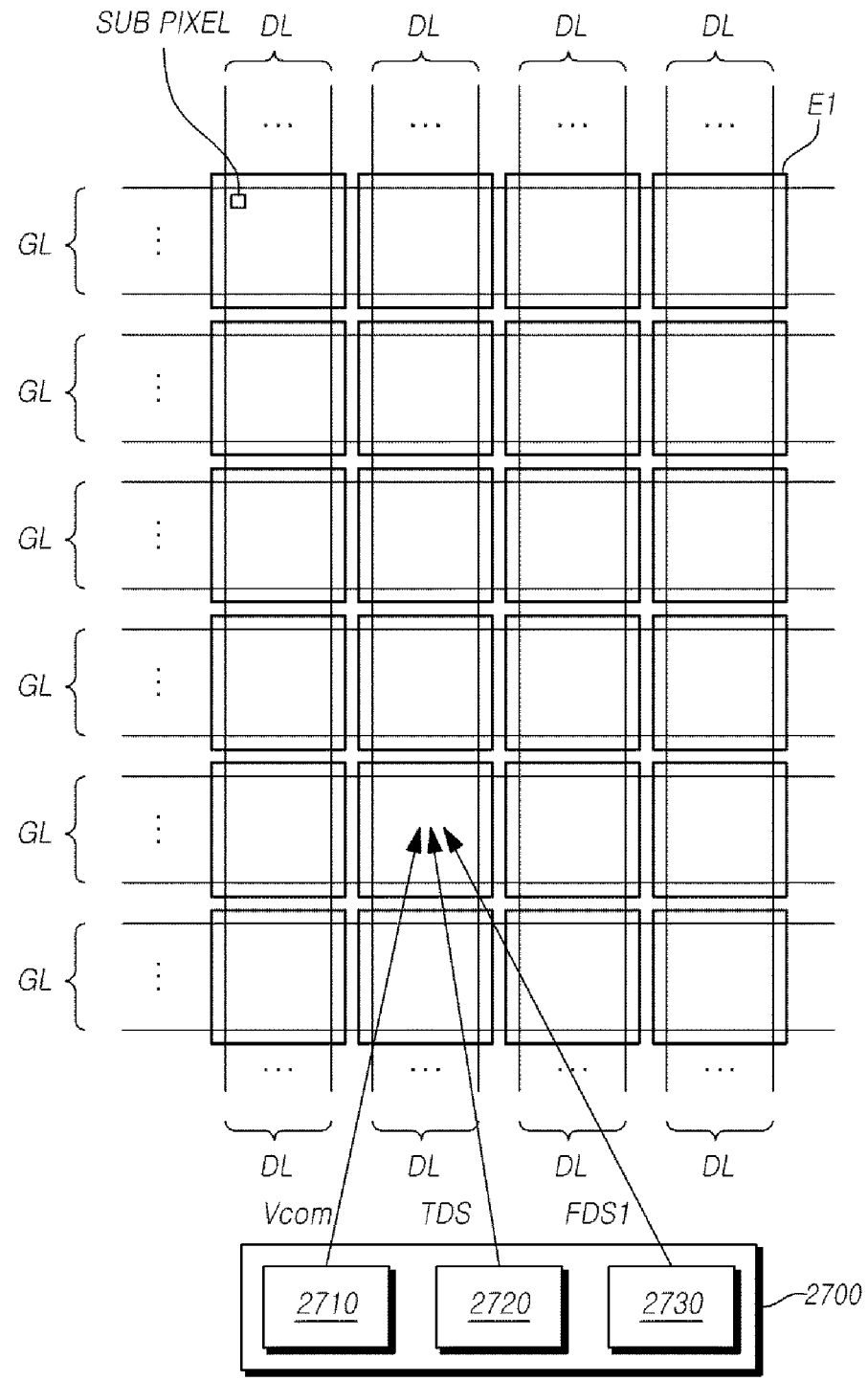
FIG. 27 to FIG. 30 illustrate exemplary display driving ICs of the touch display device according to the present embodiments.

Referring to FIG. 27, the display driving IC 2700 may be a driving IC for the first electrode E1.

The display driving IC 2700 includes: a display driving circuit 2710 supplying a display driving voltage (e.g. a common voltage Vcom) to the plurality of first electrodes E1 disposed within the display panel 110 in a display driving period D; a touch driving circuit 2720 sequentially applying a touch driving signal TDS to at least one first electrode among the plurality of first electrodes E1 in a touch driving period T; and a force driving circuit 2730 applying a first force driving signal FDS1 to at least one first electrode among the plurality of first electrodes E1 in a force driving period F.

The display driving IC 2700 illustrated in FIG. 27 may be an exemplary embodiment of the first electrode driving circuit 1310 illustrated in FIG. 13A and FIG. 13B.

The use of the above-described display driving IC 2700 can efficiently drive the plurality of first electrodes E1 according to three driving operations (display driving, touch driving, and force driving) even in the case in which the plurality of first electrodes E1 are common electrodes used in the entire three driving operations.

Figure 28:
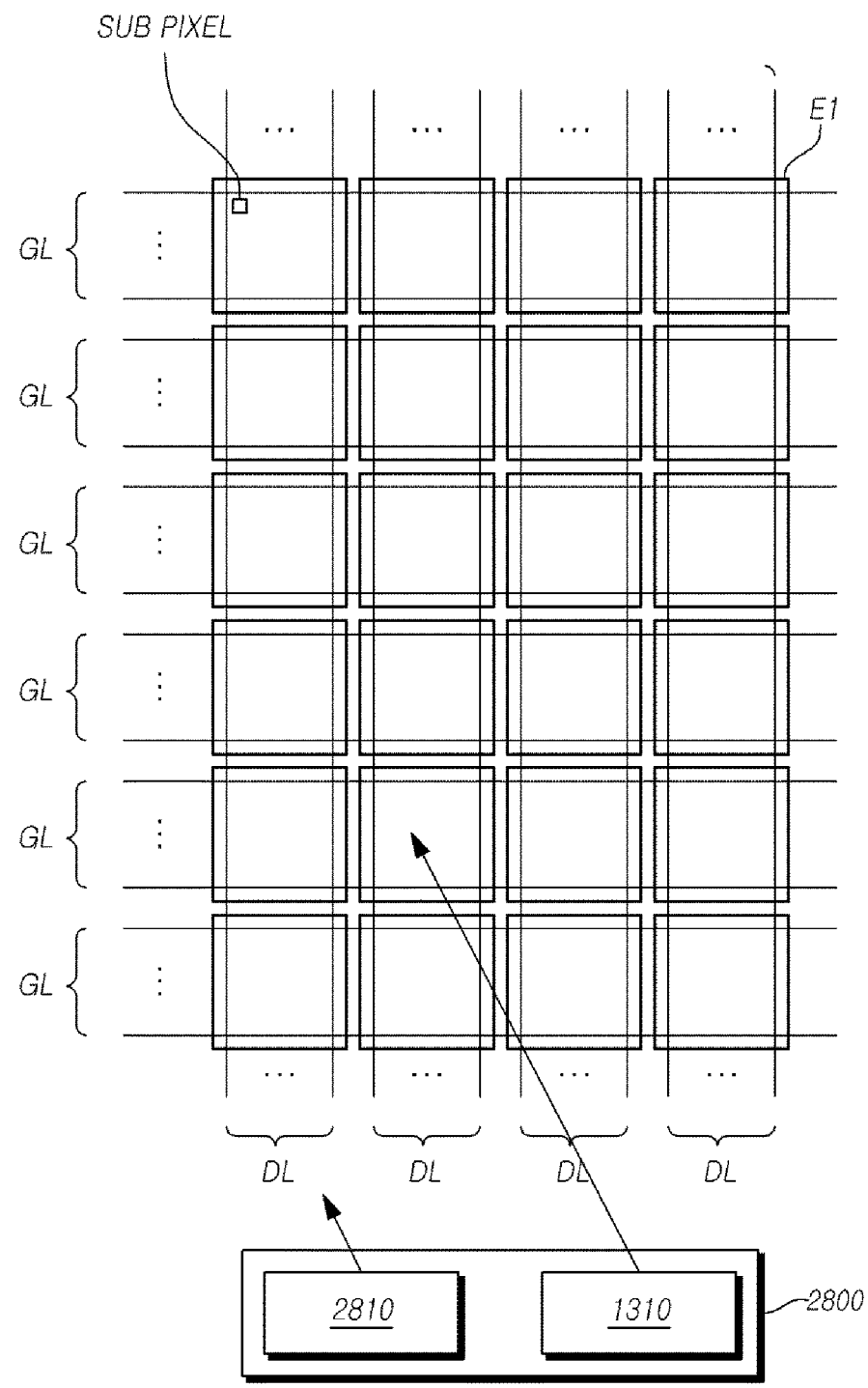

Referring to FIG. 28, the display driving IC 2800 includes the first electrode driving circuit 1310 and a data driving circuit 2810. The data driving circuit 2810 drives a plurality of data lines DL disposed on the display panel 110 by supplying data voltages to the plurality of data lines DL.

Figure 29:
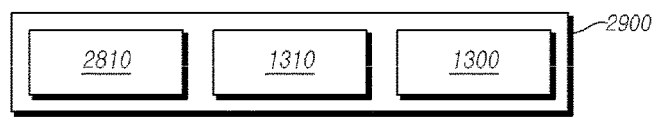

Referring to FIG. 29, the display driving IC 2900 further includes a signal generating circuit 1300, in addition to the first electrode driving circuit 1310, and the data driving circuit 2810.

Figure 30:
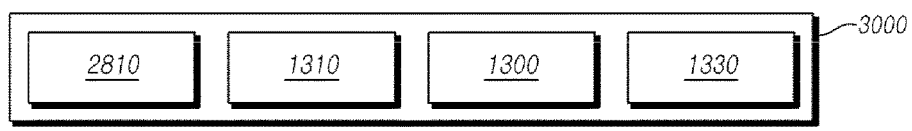

Referring to FIG. 30, the display driving IC 3000 further includes a detection processor 1330, in addition to the first electrode driving circuit 1310, the driving circuit 2810, and the signal generating circuit 1300.

One of the display driving ICs 2700, 2800, 2900, and 3000, illustrated in FIG. 27 to FIG. 30, may be used considering the size of the touch display device 100, the size and resolution of the display panel 110, and the space and design of the driving circuit of the touch display device 100.

According to the present embodiments as set forth above, when a user touches a screen, not only can a touch position be sensed, but also a level of touch force with which the user presses the screen can also be efficiently sensed, in order to provide a range of functions.

In addition, according to the present embodiments, the electrodes E1 of a single type disposed within the display panel 110 can be used for three distinct driving operations, including display (image output), touch sensing, and force sensing, thereby reducing the number of electrodes required for the three driving operations.

Furthermore, according to the present embodiments, when the electrodes E1 of a single type disposed within the display panel 110 are used for three distinct driving operations, including display (image output), touch sensing, and force sensing, the three distinct driving operations can be performed without confusion or interference.

The foregoing descriptions and the accompanying drawings have been presented in order to explain the certain principles of the present disclosure. A person skilled in the art to which the disclosure relates can make many modifications and variations by combining, dividing, substituting for, or changing the elements without departing from the principle of the disclosure. The foregoing embodiments disclosed herein shall be interpreted as illustrative only but not as limitative of the principle and scope of the disclosure. It should be understood that the scope of the disclosure shall be defined by the appended Claims and all of their equivalents fall within the scope of the disclosure.

What is claimed is:

1. A touch display device comprising:
a plurality of first electrodes disposed within a display panel;
one or more second electrodes disposed outside of the display panel and separated from the first electrodes by a gap; and
a driving circuit to:
provide a touch driving signal to at least one first electrode among the plurality of first electrodes in a touch driving period of a frame period, the touch driving signal provided to the at least one first electrode having a plurality of pulses during the touch driving period of the frame period;
during the touch driving period, sense a touch position based on a change in capacitance between the first electrode provided with the touch driving signal and a pointer;
provide a first force driving signal to the at least one first electrode among the plurality of first electrodes during a force driving period, and provide a second force driving signal different than the first force driving signal to the one or more second electrodes during the force driving period; and
during the force driving period, sense a touch force based on a change in capacitance between a group of the first electrodes provided with the first force driving signal and the one or more second electrodes provided with the second force driving signal,
wherein the group of the first electrodes includes at least two first electrodes and the at least two first electrodes are electrically connected to each other.

2. The touch display device of claim 1, wherein the driving circuit time divides the frame period into a display driving period, the touch driving period, and the force driving period, wherein the driving circuit provides a common voltage to the first electrodes during the display driving period.

3. The touch display device of claim 1, wherein, in the touch driving period, when the touch driving signal is provided to the at least one first electrode among the plurality of first electrodes, the driving circuit applies a load-free driving signal to the second electrode, the load-free driving signal being in-phase with the touch driving signal.

4. The touch display device of claim 1, wherein, in the force driving period,
the first force driving signal and the second force driving signal are pulse signals;
the first force driving signal is a signal having a first direct-current voltage, and the second force driving signal is a signal having a second direct-current voltage;
age;

the first force driving signal is a pulse signal, and the second force driving signal is a signal having the second direct-current voltage; or
the first force driving signal is a signal having the first direct-current voltage, and the second force driving signal is a pulse signal.

5. The touch display device of claim 4, wherein, in the force driving period, when the first force driving signal and the second force driving signal are pulse signals, the first force driving signal is in-phase with or in reverse phase with the second force driving signal.

6. The touch display device of claim 5, wherein, in the force driving period, when the first force driving signal and the second force driving signal are pulse signals, the second force driving signal is in-phase with the first force driving signal, and an amplitude of the second force driving signal is greater than an amplitude of the first force driving signal.

7. The touch display device of claim 4, wherein the first direct-current voltage is a first reference voltage or a ground voltage, the second direct-current voltage is a second reference voltage or a ground voltage, and the first reference voltage and the second reference voltage are the same voltage or are different voltages.

8. The touch display device of claim 4, wherein, in the force driving period, when the first force driving signal is a signal having a first direct-current voltage and the second force driving signal is a signal having a second direct-current voltage, the first direct-current voltage and the second direct-current voltage are different voltages.

9. The touch display device of claim 1, wherein a size of the gap is changeable depending on a level of touch force.

10. The touch display device of claim 1, wherein, in the force driving period, the driving circuit detects a level of touch force by determining a change in capacitance between each of the one or more first electrodes and the one or more second electrode based on a signal received from each of the first electrodes, the signal generated based on the first force driving signal and the second force driving signal.

11. The touch display device of claim 1, wherein, in the force driving period, the driving circuit detects a level of touch force by determining a change in capacitance between each of the one or more first electrodes and the one or more second electrodes based on a signal received from a group of the first electrodes that includes at least two first electrodes among the one or more first electrodes.

12. The touch display device of claim 1, wherein the one or more second electrodes comprise a plurality of second electrodes.

13. The touch display device of claim 12, wherein, in the force driving period, the driving circuit applies a second force driving signal to a specific second electrode among the plurality of second electrodes corresponding to the touch position detected in the touch driving period.

14. The touch display device of claim 13, wherein, in the force driving period, the driving circuit applies the first force driving signal to all of the plurality of first electrodes or applies the first force driving signal to a first electrode among the plurality of first electrodes corresponding to the specific second electrode when providing a second force driving signal to the specific second electrode.

15. The touch display device of claim 13, wherein, in the force driving period, the driving circuit applies a second force driving signal to the specific second electrode and surrounding second electrodes close to the specific second electrode, applies the first force driving signal to all of the plurality of first electrodes, or applies the first force driving signal to first electrodes among the plurality of first electrodes corresponding to the specific second electrode and the surrounding second electrodes.

16. The touch display device of claim 1, wherein the touch driving signal and the first force driving signal are a same signal.

17. A method of driving a touch display device, the touch display device comprising a plurality of first electrodes disposed within a display panel and one or more second electrodes separated from the first electrodes by a gap, the method comprising:
providing a touch driving signal to at least one first electrode among the plurality of first electrodes disposed within the display panel during a touch driving period of a frame period, the touch driving signal provided to the at least one first electrode having a plurality of pulses during the touch driving period of the frame period;
during the touch driving period, sensing a touch position based on a change in capacitance between the first electrode provided with the touch driving signal and a pointer;
providing a first force driving signal to the at least one first electrode among the plurality of first electrodes disposed within the display panel during a force driving period, and providing a second force driving signal different than the first force driving signal to the one or more second electrodes disposed outside of the display panel during the force driving period; and
during the force driving period, sensing a touch force based on a change in capacitance between a group of the first electrodes provided with the first force driving signal and the one or more second electrodes provided with the second force driving signal,
wherein the group of the first electrodes includes at least two first electrodes and the at least two first electrodes are electrically connected to each other.

18. A driving circuit for driving touch display device, the touch display device comprising a plurality of first electrodes disposed within a display panel and one or more second electrodes separated from the first electrodes by a gap, the driving circuit comprising:
a first circuit to provide a touch driving signal to at least one first electrode among the plurality of first electrodes disposed within the display panel during a touch driving period of a frame period, the touch driving signal provided to the at least one first electrode having a plurality of pulses during the touch driving period of the frame period, the first circuit to provide a first force driving signal to the at least one first electrode among the plurality of first electrodes disposed within the display panel during a force driving period, and the first circuit to provide a second force driving signal different than the first force driving signal to the one or more second electrodes disposed outside of the display panel during the force driving period; and
a second circuit to sense a touch position based on a change in capacitance between the first electrode provided with the touch driving signal and a pointer and to sense a touch force based on a change in capacitance between a group of the first electrodes provided with the first force driving signal and the one or more second electrodes provided with the second force driving signal,
wherein the group of the first electrodes includes at least two first electrodes and the at least two first electrodes are electrically connected to each other.

19. The driving circuit of claim 18, wherein the driving circuit time divides the frame period into a display driving period, the touch driving period, and the force driving period, wherein the first circuit provides a common voltage to the first electrodes during the display driving period.

20. The driving circuit of claim 18, wherein, in the touch driving period, when the touch driving signal is provided to the at least one first electrode among the plurality of first electrodes, the first circuit applies a load-free driving signal to the second electrode, the load-free driving signal being in-phase with the touch driving signal.

21. The driving circuit of claim 18, wherein, in the force driving period,
the first force driving signal and the second force driving signal are pulse signals;
the first force driving signal is a signal having a first direct-current voltage, and the second force driving signal is a signal having a second direct-current voltage;
the first force driving signal is a pulse signal, and the second force driving signal is a signal having the second direct-current voltage; or
the first force driving signal is a signal having the first direct-current voltage, and the second force driving signal is a pulse signal.

22. The driving circuit of claim 21, wherein, in the force driving period, when the first force driving signal and the second force driving signal are pulse signals, the first force driving signal is in-phase with or in reverse phase with the second force driving signal.

23. The driving circuit of claim 22, wherein, in the force driving period, when the first force driving signal and the second force driving signal are pulse signals, the second force driving signal is in-phase with the first force driving signal, and an amplitude of the second force driving signal is greater than an amplitude of the first force driving signal.

24. The driving circuit of claim 21, wherein the first direct-current voltage is a first reference voltage or a ground voltage, the second direct-current voltage is a second reference voltage or a ground voltage, and the first reference voltage and the second reference voltage are the same voltage or are different voltages.

25. The driving circuit of claim 21, wherein, in the force driving period, when the first force driving signal is a signal having a first direct-current voltage and the second force driving signal is a signal having a second direct-current voltage, the first direct-current voltage and the second direct-current voltage are different voltages.

26. The driving circuit of claim 18, wherein, in the force driving period, the second circuit detects a level of touch force by determining a change in capacitance between each of the one or more first electrodes and the one or more second electrode based on a signal received from each of the first electrodes, the signal generated based on the first force driving signal and the second force driving signal.

27. The driving circuit of claim 18, wherein, in the force driving period, the second circuit detects a level of touch force by determining a change in capacitance between each of the one or more first electrodes and the one or more second electrodes based on a signal received from a group of the first electrodes that includes at least two first electrodes among the one or more first electrodes.

28. The driving circuit of claim 18, wherein, the one or more second electrodes comprise a plurality of second electrodes, and in the force driving period, the first circuit applies a second force driving signal to a specific second electrode among the plurality of second electrodes corresponding to the touch position detected in the touch driving period.

29. The touch display device of claim 1, wherein one or more second electrodes are floated during the touch driving period while the touch driving signal is provided to the at least one first electrode among the plurality of first electrodes.

30. The touch display device of claim 1, wherein a capacitance corresponding to the gap between the plurality of first electrodes and the one or more second electrodes changes depending on presence of the force touch.

* * * * *